United States Patent
Landau

(10) Patent No.: US 6,279,095 B1
(45) Date of Patent: Aug. 21, 2001

(54) METHOD AND APPARATUS FOR OMNIBUS WIRING OF VIRTUAL MAPPING TABLE ENTRIES

(75) Inventor: Charles Robert Landau, Santa Clara, CA (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/189,601

(22) Filed: Nov. 9, 1998

(51) Int. Cl.[7] ............................. G06F 12/00; G06F 12/08; G06F 12/10
(52) U.S. Cl. ..................... 711/203; 711/206; 711/209; 711/147
(58) Field of Search ..................... 711/203, 209, 711/206, 207, 208, 147

(56) References Cited

U.S. PATENT DOCUMENTS

| | | | |
|---|---|---|---|
| 4,277,826 | * 7/1981 | Collins et al. ..................... | 711/206 |
| 4,584,639 | * 4/1986 | Hardy ..................... | 713/200 |
| 5,727,178 | * 3/1998 | Pletcher et al. ..................... | 711/202 |

OTHER PUBLICATIONS

Norman Hardy "KeyKOS Architecture," Operating Systems Review, vol. 19. n. 4, Oct. 1985, pp. 8–25.

Document entitled "A Programmer's Introduction to EROS," URL:http://www.cis.upenn.edu/~eros/devel/intro/ProgrmrIntro.html, 14 pages total. (publication date unknown).

Norman Hardy, "The KeyKOS Architecture," Eighth Edition (Dec. 1990), Copyright©Key Logic, eight pages total.

Richard Rashid, Avadis Tevanian, Michael Young David Golub, Robert Baron, David Black, William Bolosky and Jonathan Chew, "Machine–Independent Virtual Memory Management for Paged Uniprocessor and Multiprocessor Architectures," Department of Computer Science, Carnegie Mellon University, Pittsburgh, Pennsylvania 15213, $2^{nd}$ Symposium on Architectural Support for Programming Languages and Operating Systems, ACM Oct., 1987, eight pages total.

* cited by examiner

Primary Examiner—Hiep T. Nguyen
Assistant Examiner—Yamir Encarnación
(74) Attorney, Agent, or Firm—Fenwick & West LLP

(57) ABSTRACT

A method and apparatus that operates within a virtual memory system in which portions of the memory system can be "omnibus wired," Omnibus wiring a page guarantees that the page is present in memory and that the mapping tables pointing to the page's location are also present and filled in for all possible address references to the page. Because the system is which the present invention is implemented allows memory sharing between processes, there can be several virtual addresses that address a single page. Various elements in the virtual memory system include a "cached MSCR" field. The cached MSCR field is used to determine whether it is necessary to continue recursing upwards when performing omnibus wiring, since there is a special case associated with "uplevel references" and omnibus wiring.

28 Claims, 28 Drawing Sheets

Object-Oriented Virtual Memory Scheme

Format of PMOs and MORs

Format of NSKMPage Data Structure

Format of Mapping Table

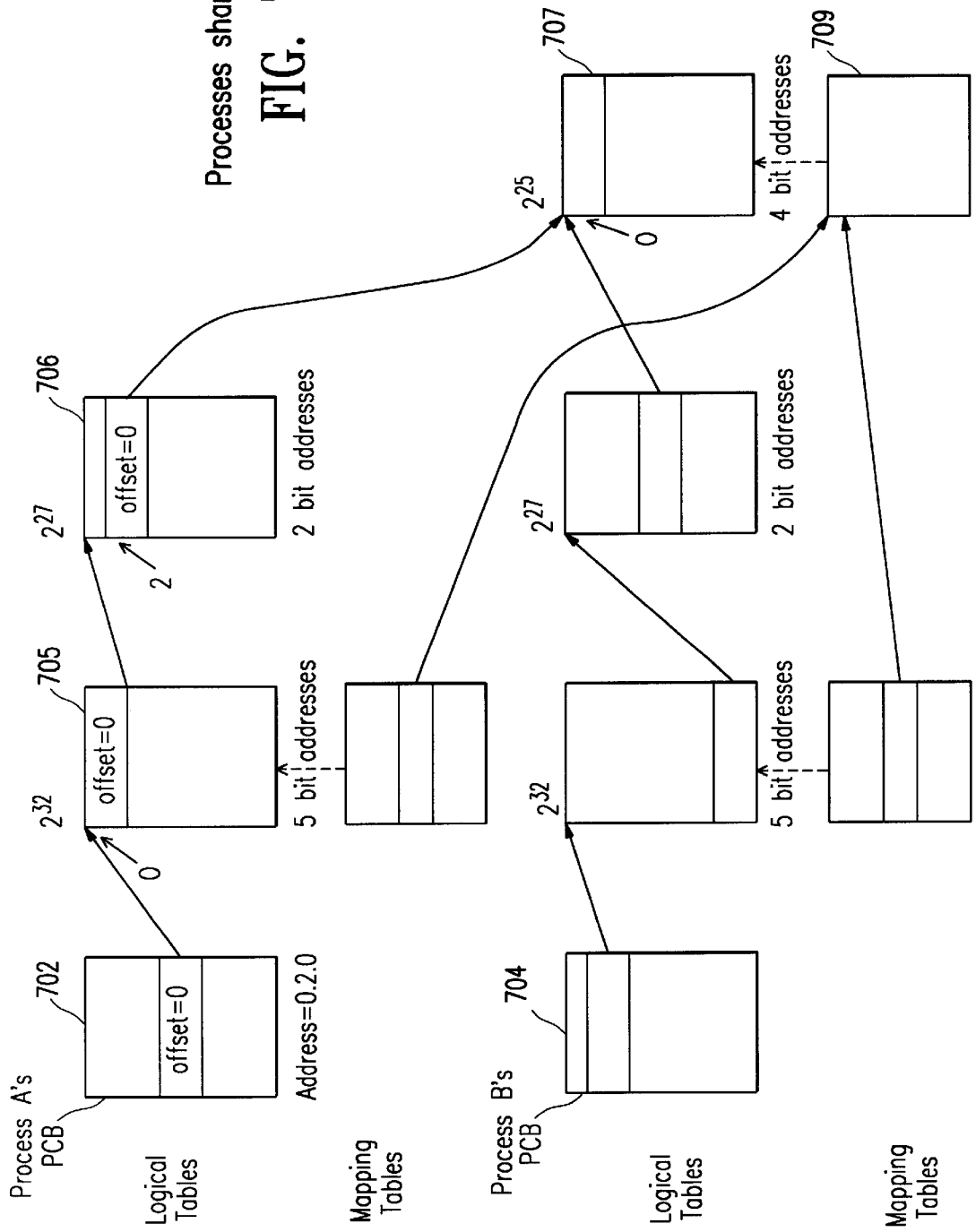
FIG. 7(a) Processes sharing memory

Processes Sharing Memory
(including an Uplevel Reference)

Addressing An Uplevel Reference

Overview of Omnibus Wiring

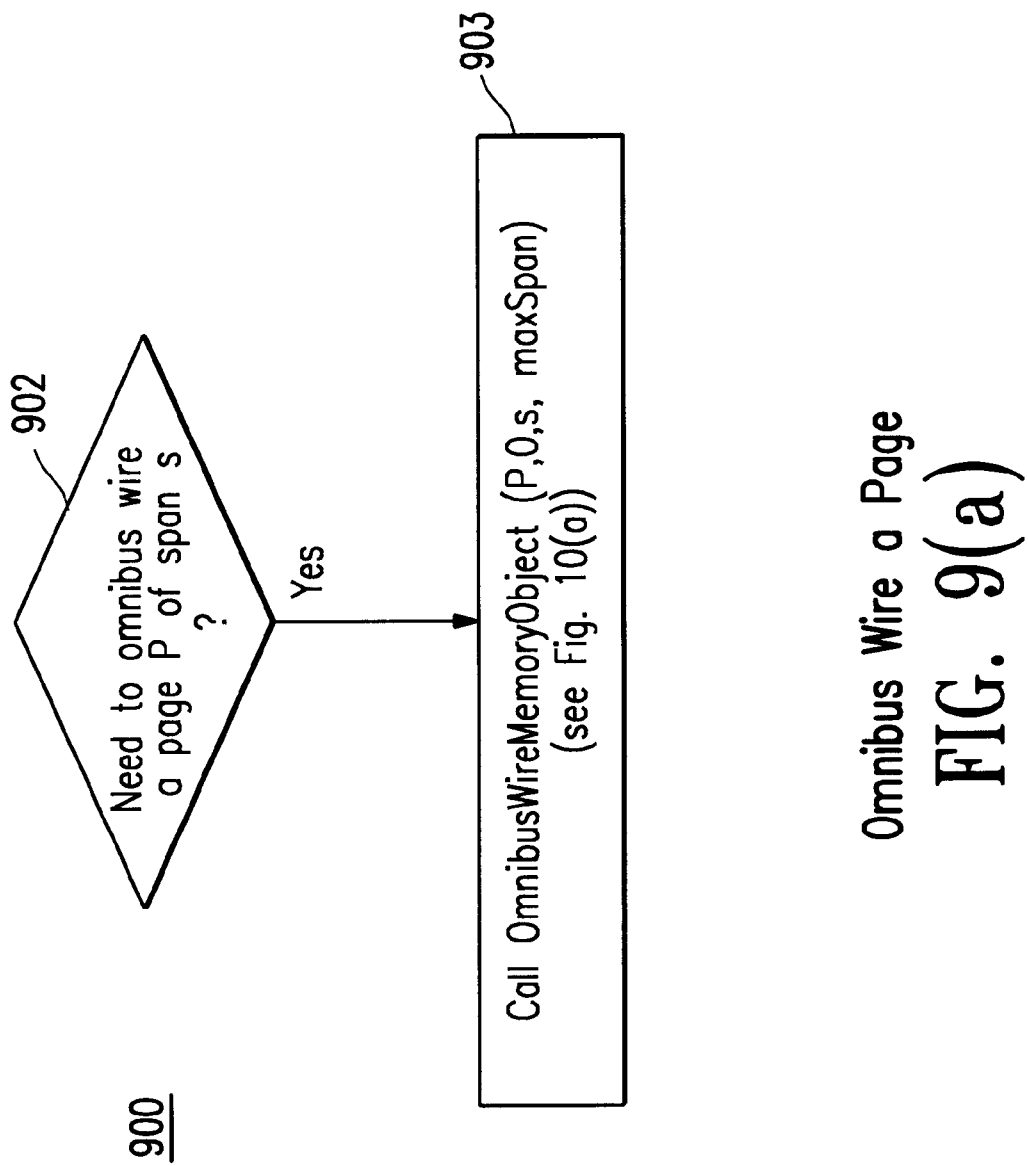
FIG. 9(a) Omnibus Wire a Page

Constructing a MOR That Refers to an Omnibus Wired Memory Object (either an NSKMPage or another PMO) (Done once in phase 1 and once in phase 2)

Omnibus wiring a memory object (a page or a PMO)

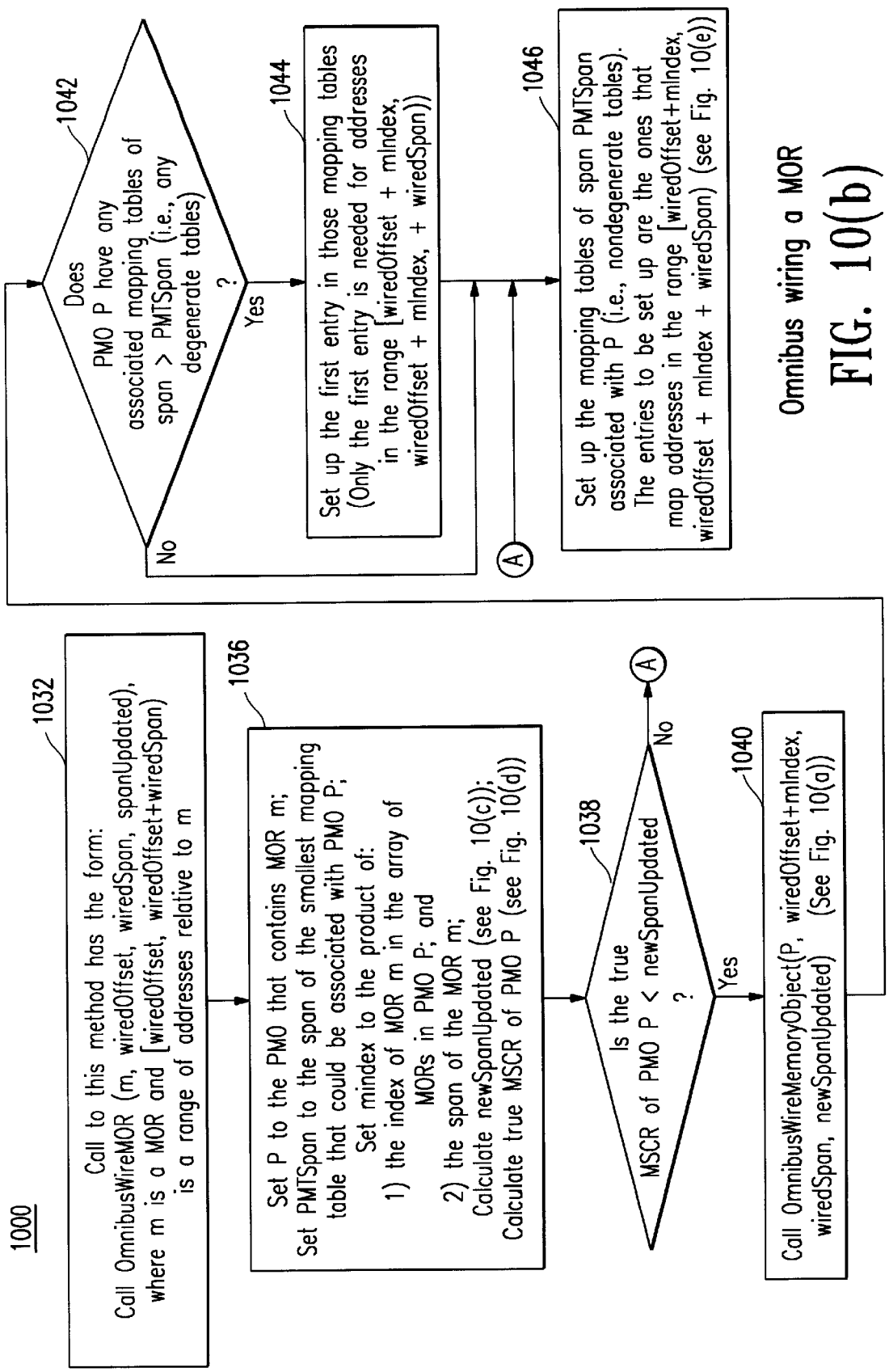
FIG. 10(b) Omnibus wiring a MOR

Determine "newSpanUpdated"

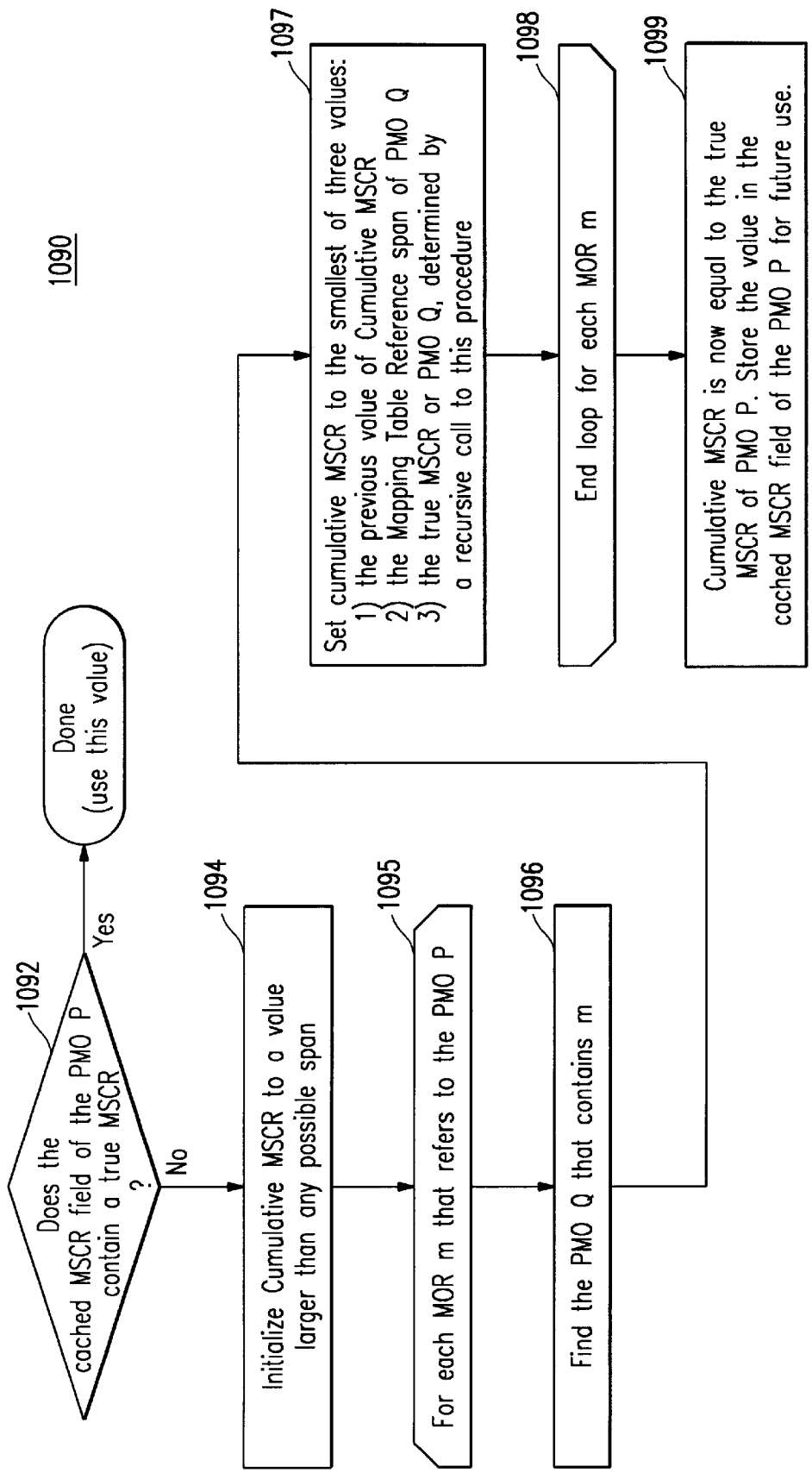
FIG. 10(d) Determine "true MSCR" for a PMO P

Recursing Downward to Omnibus Wire a MOR
(Recursive procedure OmnibusWireDown)

Recursing Downward to Omnibus Wire a MOR (Recursive procedure OmnibusWireDown) (cont.)

Recursing Downward to Omnibus Wire a MOR (Recursive procedure OmnibusWireDown) (cont.)

Recursing Downward to Omnibus Wire a MOR
(Recursive procedure OmnibusWireDown) (cont.)

FIG. 13 Phase One, Recurse Upwards

Phase One, Recurse Downwards

Phase two.
Recurse upwards and downwards

Uplevel Reference After Upward Recursion

A Degenerate Mapping Table

METHOD AND APPARATUS FOR OMNIBUS WIRING OF VIRTUAL MAPPING TABLE ENTRIES

RELATED APPLICATIONS

This invention is related to the following applications, both of which are herein incorporated by reference:

1) U.S. application Ser. No. 09/046,943, entitled "Method and Apparatus for Managing Copy on Write Operations in a Virtual Memory," of Landau, filed Mar. 23, 1998.
2) U.S. application Ser. No. 09/137,763, entitled "Method and Apparatus for Managing Invalidation of Virtual Memory Mapping Tables," of Landau, filed Aug. 20, 1998.

BACKGROUND OF THE INVENTION

The present invention relates generally to a method and apparatus for memory management and more specifically, to a method and apparatus for ensuring that memory pages will always be present and mapped in the memory of a data processing system.

Many types of general purpose computers and data processing systems contain memory that is organized using a "virtual memory" scheme. In general virtual memory allows applications and/or processes that are executing in the computer to behave as if they have an unlimited amount of memory at their disposal. In actuality, the amount of memory available to a particular application or process is limited by the amount of memory in the data processing system and further limited by the number of concurrently executing programs sharing that memory. In addition, a virtual memory scheme hides the actual physical address of memory from the application programs. Application programs access their memory space using a logical address, which is then converted to a physical address by the data processing system.

A virtual memory system organizes memory in units called "pages." These pages are moved between a fast, primary memory and one or more larger and usually slower secondary, tertiary, etc. memories. The movement of pages (often called "swapping") is transparent to the applications or processes that are executed in the data processing system, enabling the applications or processes to behave as if they each have an unlimited amount of memory.

A page fault occurs when an application program requests a particular page of memory, but that page is not present in memory, or when a particular page is present but not yet mapped into the program's address space (i.e., when the page is not "mapped"). Operating systems usually respond to a page fault by bringing the missing page into memory and mapping it. Bringing the page into memory and/or mapping it, however, can be too time-consuming for certain application programs.

Therefore, many data processing systems allow application programs (or users) to "lock" memory. Locking memory means that the memory is guaranteed to be present in the memory of the data processing system and that it will not be swapped out. Locking some or all of the memory avoids "page faults" for the locked memory because the locked pages are guaranteed to be present. Locking some or all of memory may not, however, guarantee that the memory is mapped.

While some conventional systems implement a virtual paging scheme that allows applications and/or processes executing on the system to share memory, these data processing systems generally do not guarantee that shared memory will be mapped.

SUMMARY OF THE INVENTION

A preferred embodiment of the present invention operates within an object-oriented virtual memory management system. In the virtual memory management system, each page is referenced by traversing a series of mapping tables, which point to pages present in memory. Each mapping table is associated with one of a plurality of Partitioned Memory Objects (PMOs). Each PMO includes a plurality of Memory Object References (MORs). The lowest level PMOs point to NSKMPage data structures or BMOs (not shown). The NSKMPage data structures keep track of all pages in the physical memory. BMOs keep track of pages in the virtual memory that are not in physical memory. Both PMOs and NSKMPage data structures are collectively called "memory objects."

A preferred embodiment of the present invention guarantees that a page of memory is physically mapped in all addressing paths in which it appears via a scheme called "omnibus wiring." Omnibus wiring is used, for example, when a page needs to be "locked." If a page is omnibus wired, it is guaranteed that the page is present in memory and the mapping tables pointing to the page's location are present and filled in for all possible address references to the page. Because the system is which the present invention is implemented allows memory sharing between processes, there can be several virtual addresses that address a single page. Some of these references may include "uplevel references," which are references to a portion of a larger address space than can be addressed by the MOR.

Omnibus wiring can be invoked in two ways: 1) when a request is received that a page should be omnibus wired (see FIG. 9(a)) and 2) when a new mapping is created that leads to a page that is already omnibus wired (e.g., when two processes share memory) (see FIG. 9(b)).

In a preferred embodiment of the present invention, omnibus wiring is performed in two phases. A first phase, called the "dry run" creates any necessary mapping tables but does not make any logical changes to existing mapping tables. The dry run allows the data processing system to back out of its promise to do omnibus wiring if some failure occurs during the dry run. The second phase involves making changes to logical tables by recursing up and down through the logical tables making necessary changes to the logical tables. Omnibus wiring can also be performed in a single stage, where the two phases are combined.

Each PMO contains an Omnibus wiring (OW) flag, which indicates that some downstream memory objects are already omnibus wired, i.e., that all mapping tables needed to map the omnibus wired objects are actually filled in and that the corresponding pages are present in memory.

The "span" of a PMO is the size of memory that can be referenced by the PMO. The span of an entry in a PMO is the span of the next smaller PMO (or, if this is the smallest PMO, the size of a page). The span of a mapping table is the size of the memory that can be referenced by the mapping table. The span of an entry in a mapping table is the span of the next smaller mapping table (or if this is the smallest mapping table, the size of a page). Each PMO also has an associated "Mapping Table Reference span" (called an "MTR span"). An MTR span is a span of the entries in a smallest mapping table that can be associated with the PMO. (As described above, the span of these entries is the span of the next smaller mapping table).

Each PMO also contains a "cached min Span Code Referrer Mapping Table Reference" (cached MSCR) field. The cached MSCR field of a PMO usually indicates the smallest mapping table reference (MTR) of any PMO that references that PMO directly or indirectly. Thus, it is known that, for a particular PMO, there are no upstream mapping tables having entries with a smaller span than the cached MSCR value of the PMO.

The cached MSCR field is used to determine whether it is necessary to continue recursing upwards when omnibus wiring a MOR, since there is a special case associated with "uplevel references" and omnibus wiring, as described below in more detail.

In accordance with the purpose of the invention, as embodied and broadly described herein, the invention relates to a method, performed by a data processing system having a virtual memory system, to omnibus wire a page in memory, comprising: following a first group of pointers that refer to the omnibus wired page upwards in the virtual memory system to ensure that all elements referenced by the first group of pointers are also omnibus wired, where omnibus wiring the page guarantees that the page is present in memory, that all mapping tables referencing the omnibus wired page are also present in memory, and that the omnibus wired page can be referenced via the mapping tables; and following a second group of pointers that also refer to the omnibus wired page, where the second group of pointers are part of an uplevel reference, upwards in the virtual memory system to ensure that all memory elements referenced by the second group of pointers are also omnibus wired.

The invention further comprises the act of checking a cached MSCR field in a first memory element in the second group and, if the cached MSCR field is greater than or equal to a span of a memory element in the second group, stopping the upwards recursion.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 7(a) is a diagram illustrating a first process sharing the memory space of a second process.

FIG. 9(a) shows steps to omnibus wire a page.

FIGS. 10(a) through 10(e) are flow charts showing steps to recurse upward through tables during the omnibus wiring process of FIG. 8.

DETAILED DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

A preferred embodiment of the present invention operates in a virtual memory system. This virtual memory system is described below, along with a description of preferred embodiments of the present invention.

I. General Background

Figure 1:
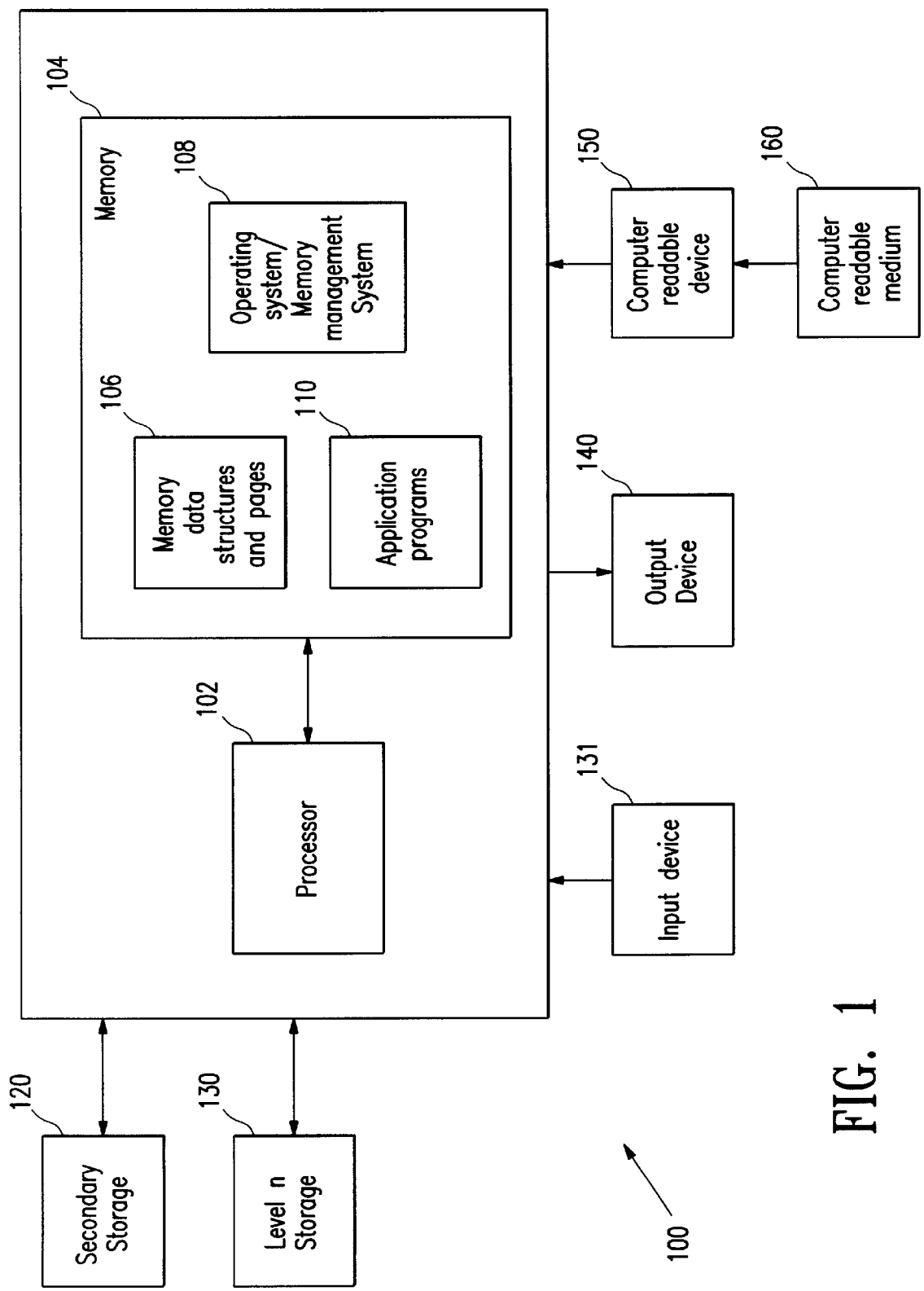
FIG. 1 is a block diagram of a data processing system in accordance with a preferred embodiment of the present invention.

FIG. 1 is a block diagram of a data processing system 100 in accordance with a preferred embodiment of the present invention. In FIG. 1, data processing system 100 includes a processor 102 and a storage area 104 (such as a memory). Storage area 104 includes application software programs 110, memory data structures and pages 106, and an operating system 108 including a memory management system. System 100 also includes additional storage, such as secondary storage 120 and level n storage 130. Secondary and level n storage 120, 130 preferably are larger, slower types of storage than storage 104. Storage 120, 130 are used to hold pages of memory that are not currently present in storage area 104 (i.e., pages that are "swapped out").

In a preferred embodiment of the present invention, operating system 108 is the Tandem Non-Stop operating system, release G05, available from Tandem Computers, Inc. of Cupertino, Calif.

System 100 includes an input device 131, such as a keyboard, a touchpad, or a mouse that receives input from a user or other appropriate source. System 100 also includes an output device 140, such as a display screen, a printer, etc. that outputs information to the user or other appropriate destination.

A person of ordinary skill in the art will understand that system 100 may also contain additional information, such as input/output lines; input devices, such as a keyboard, a mouse, and a voice input device; and display devices, such as a display terminal. System 100 may also may include application programs, operating systems, data, etc., which are not shown in the figure for the sake of clarity. It also will be understood that system 100 can also include numerous elements not shown, such as disk drives, keyboards, display devices, network connections, additional memory, additional CPUs, additional processors, LANs, input/output lines, etc.

In the following discussion, it will be understood that the steps of methods and flow charts discussed preferably are performed by processor 102 (or another appropriate processor) executing instructions stored in storage area 104 (or other appropriate memories). Specifically, the steps described herein are performed by operating system/memory management system 108 and are transparent to application programs 110. It will also be understood that the invention is not limited to any particular implementation or programming technique and that the invention may be implemented using any appropriate techniques for implementing the functionality described herein. The invention is not limited to any particular programming language or operating system.

Some or all of the instructions and data structures in memory 104 may be read into memory from a computer-readable medium 160. Execution of sequences of instructions contained in memory 104 causes processor 102 to perform the process steps described herein. in alternative embodiments, hard-wired circuitry may be used in place of or in combination with software instructions to implement the invention. Thus, preferred embodiments of the invention are not limited to any specific combination of hardware circuitry and software.

System 100 can also include an input device 150, which reads computer readable medium 160. The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infra-red data communications.

Common forms of computer-readable media include, for example a floppy disk, a flexible disk, a hard disk, magnetic tape, or any other magnetic medium, a CD-ROM, any other optical medium, punchcards, papertapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions of operating system 108 may initially be carried on a magnetic disk or a tape. The instructions are loaded into memory 104. Alternately, instructions can be sent over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor.

II. An Object-Oriented Virtual Memory System

Figure 2:
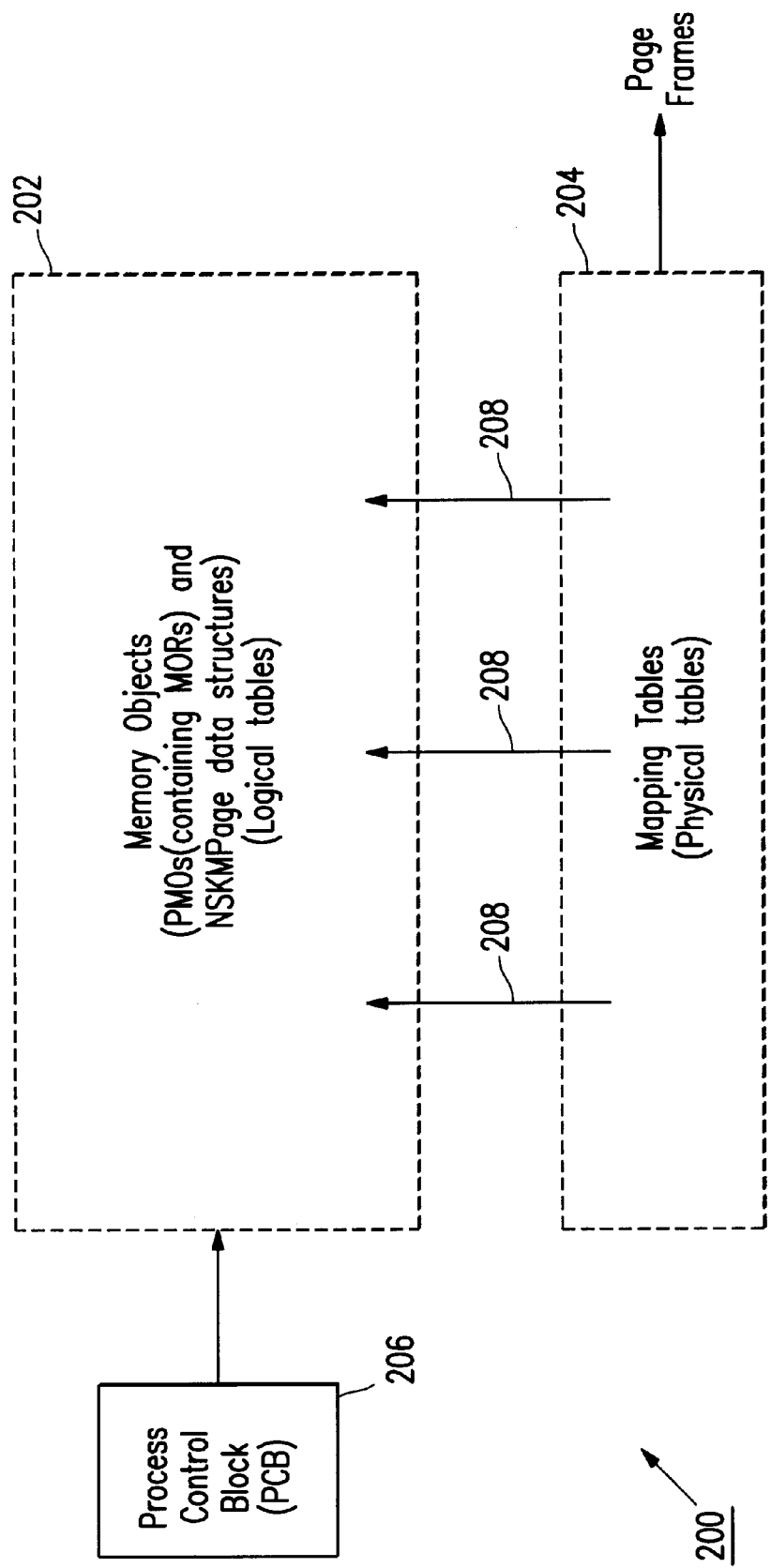
FIG. 2 is a diagram of data structures in an object-oriented virtual memory.
Figure 3:
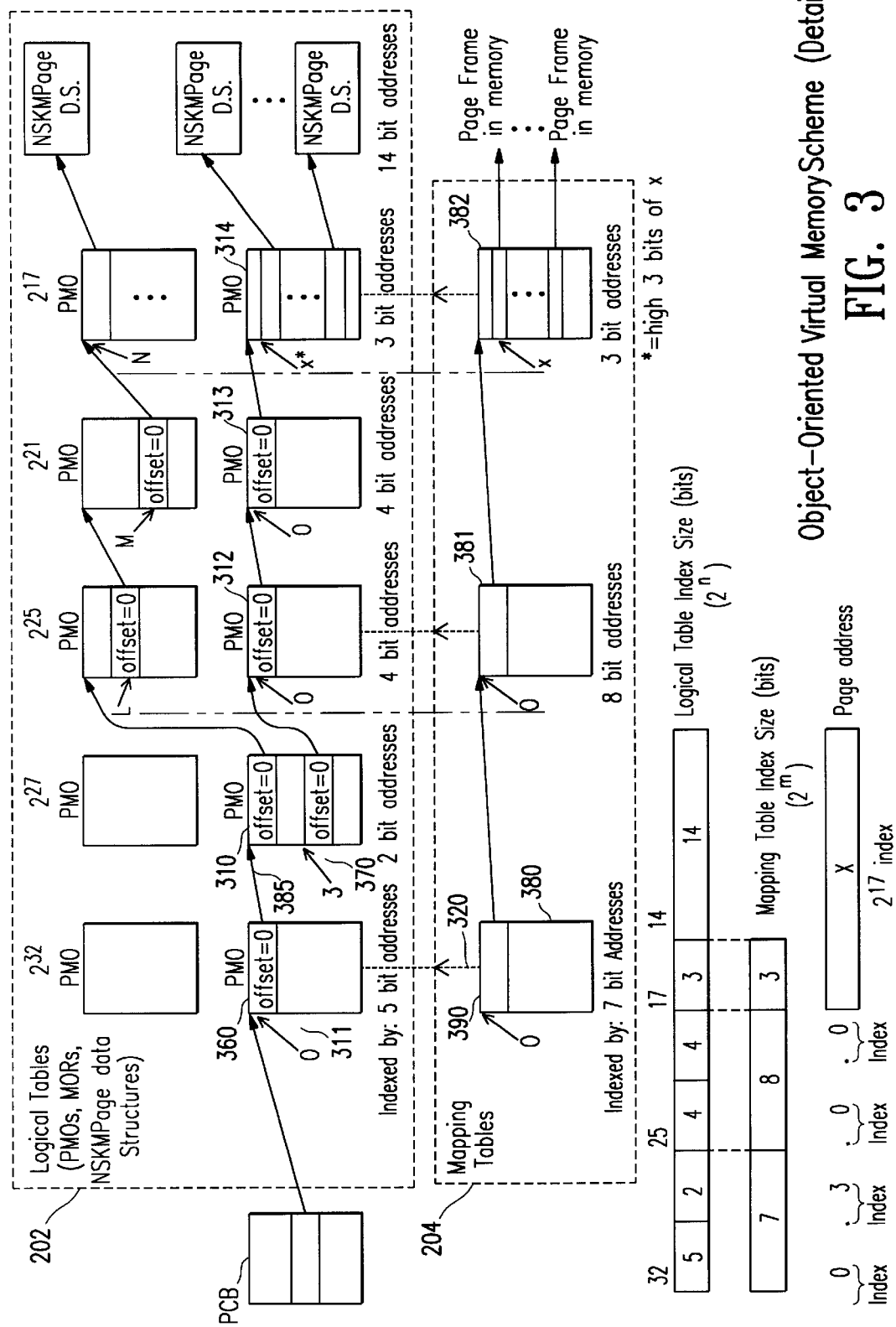
FIG. 3 is a diagram showing details of an example of logical and physical data structures in the object-oriented virtual memory of FIG. 2.

FIG. 2 is a diagram of data structures in an object-oriented virtual memory 200 in accordance with a preferred embodiment of the present invention. Only a portion of the virtual memory is shown. The object-oriented virtual memory 200 includes a PCB (Process Control Block) 206 that indicates a group of logical tables 202 for a process and a group of physical tables 204 for the process. Logical tables 202 map all the pages that are logically present in the address space of the process, whether the pages are swapped in or out. As will be described below in detail, logical tables 202 include PMOs (Partitioned Memory Objects) (which include MORs (Memory Object References)), NSKMPage data structures, and Basic Memory Objects (BMOs) as shown in FIG. 3. The physical tables 204 include mapping tables, which map locations for those pages that are physically present (i.e., that are swapped into memory 104 ). Each mapping table is associated with a PMO, as indicated by arrows 208.

The general concept of virtual memory is described, for example, in Patterson and Hennessy, "Computer Architecture, A Quantitative Approach," 2nd Edition, Morgan Kaufman, January 1996, which is herein incorporated by reference.

Figure 4:
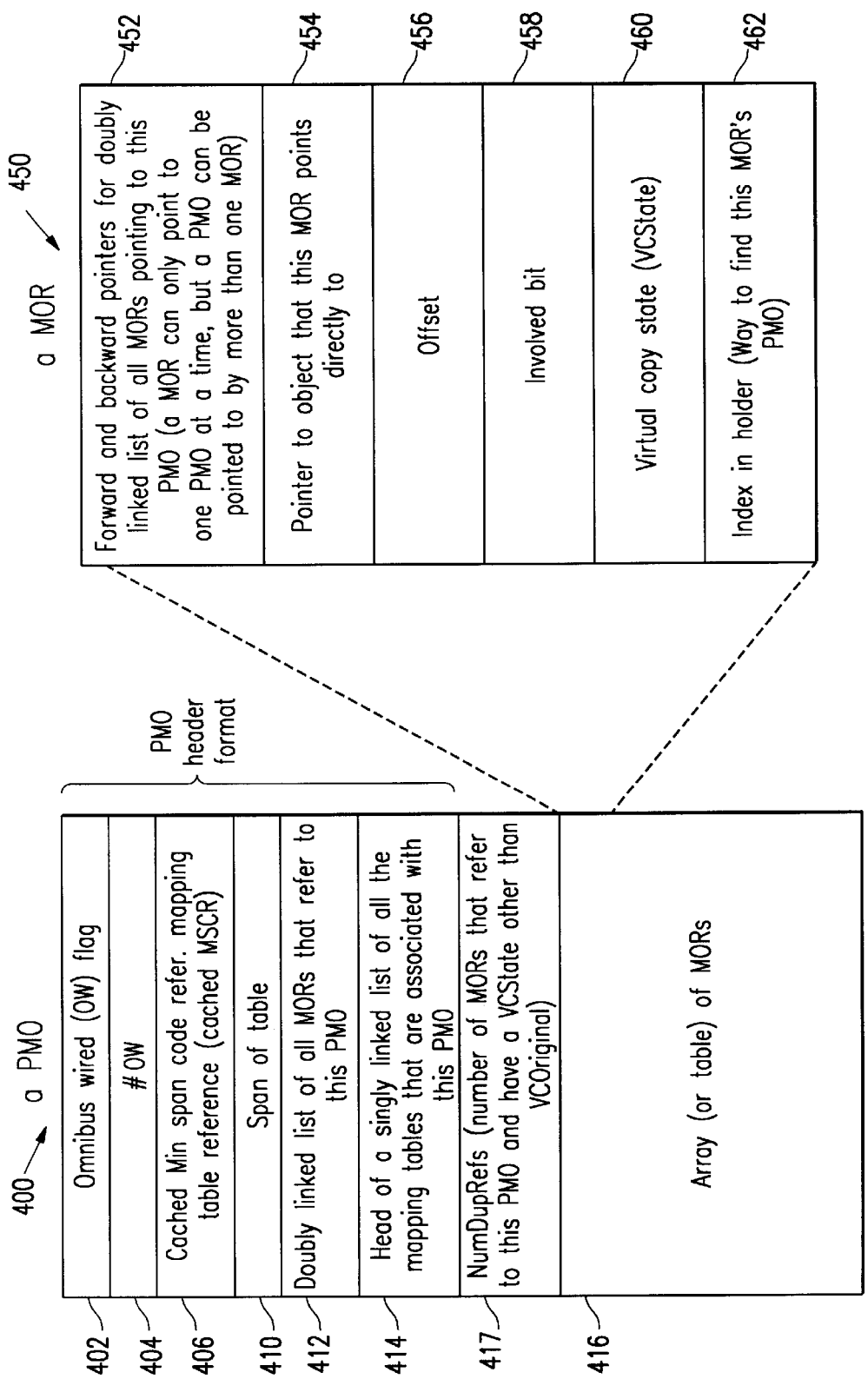
FIG. 4 is a diagram showing an exemplary format of a Partitioned Memory Object (PMO) data structure and an Memory Object Reference (MOR) data structure of FIG. 3.
Figure 5:
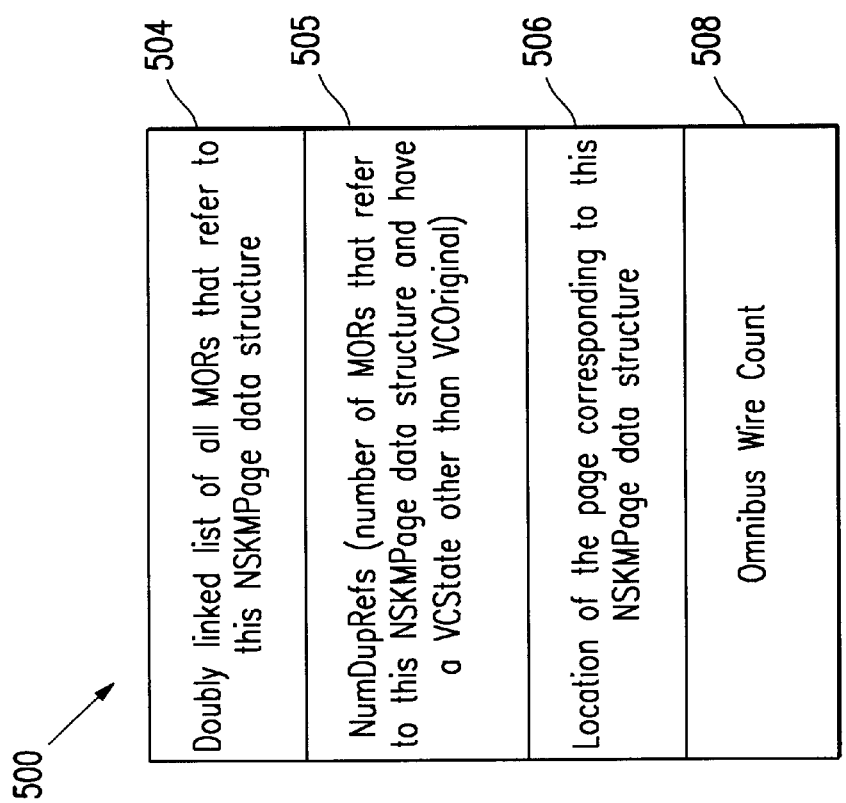
FIG. 5 is a diagram showing an exemplary format of a page data structure of FIG. 2.
Figure 6:
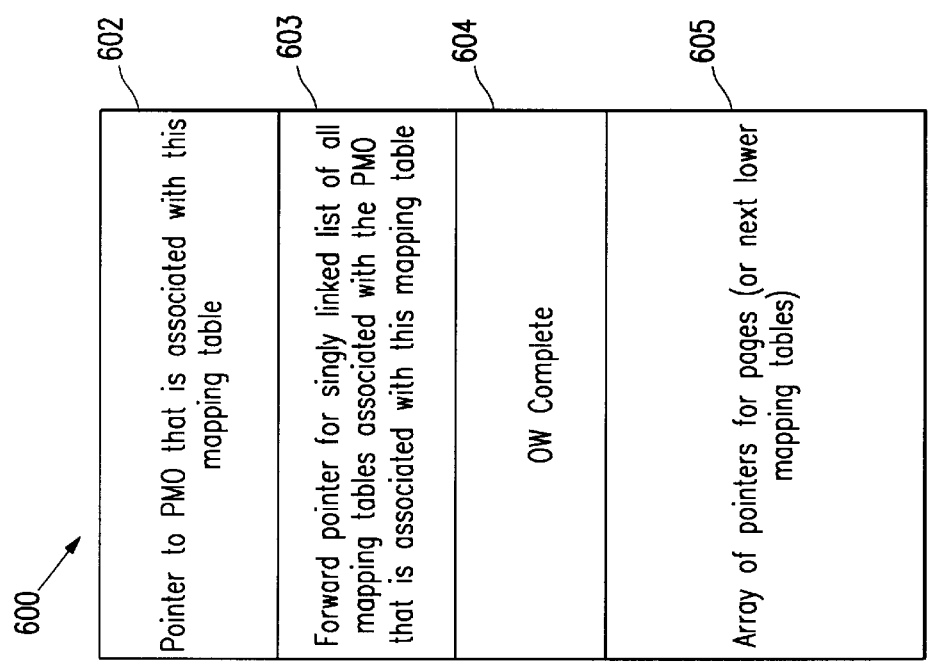
FIG. 6 is a diagram showing an exemplary format of a mapping table data structure of FIG. 2.

FIG. 3 is a diagram showing details of an example of logical and physical tables in the object-oriented virtual memory of FIG. 2. Details of exemplary formats of tables 202 and 204 are shown in FIGS. 4–6. It should be appreciated that the specific number of bits, number of levels, names of data structures, and so on, in FIG. 3 are provided for the sake of example and are not to be taken as a limitation of the invention. Similarly, although the tables are shown to be approximately the same size (vertically and horizontally), all the tables need not be the same size.

In the example of FIG. 3, both the logical tables 202 and the mapping tables 204 describe a full $2^{32}$ address space. However, mapping tables 204 only indicate whether a particular page is swapped in or out (and the location of the page if it is swapped in). In contrast, logical tables 202 indicate a location for every page in the $2^{32}$ address space. Each mapping table has a two-way "association" with a corresponding PMO in the logical tables. A PMO can be associated with one or more mapping tables. A mapping table can only be associated with one PMO.

Each PMO and each mapping table defines a certain number of addresses. This number is called a "span." For example, FIG. 3 shows an example in which a page having a virtual address of "0.3.0.0." is referenced. The notation "0.3.0.0.x" indicates successive portions of a memory address. The dots (".") separate portions of the address and the numerals indicate portions of the address, which can be varying numbers of bits long. In the example of FIG. 3, the first "0" portion of the address indexes PMO 360 and is five bits long. The "3" portion of the address indexes PMO 310 and is two bits long. The second "0" portion of the address indexes PMO 312 and is four bits long. The third "0" portion of the address indexes PMO 313 and is four bits long. The "X" portion of the address is seventeen bits long. In the example, each page is addressable by a thirty-two bit address. The number of address bits used to index each PMO 360, 310, 312, 313, and 314 is, respectively, 5, 2, 4, 4, and 3 bits. Thus, the number of MORs in each PMO is, respectively, 3 bits. Thus, the number of MORs in each PMO is, respectively, $2^5$, $2^2$, $2^4$, $2^4$, and $2^3$ and the spans of the PMOs are, respectively, $2^{32}$, $2^{27}$, $2^{25}$, $2^{21}$, and $2^{17}$. The span of an entry/MOR in, for example PMO 360, (which itself has a span of $2^{32}$) is $2^{27}$.

The number of address bits used to index each mapping table 380, 381, 382 is, respectively, 7, 8, and 3. Thus, the number of entries in each mapping table is, respectively, $2^7$, $2^8$, and $2^3$. The spans of the mapping tables are, respectively, $2^{32}$, $2^{25}$, and $2^{17}$.

An exemplary MOR 311 in PMO 360 is indexed by the first "0" portion of the address and contains a pointer to a PMO 310. The pointer to the PMO 310 is indicated in FIG. 3 by arrow 385. PMO 310 is indexed by the "3" portion of the address. MOR 311 contains an offset of "0," which is used to alter the index into the PMO under certain circumstances, as described below in detail. Similarly, mapping table entry 390 in mapping table 380 points to mapping table 381. Mapping table entries in this implementation do not include offsets. Mapping table 380 is associated with PMO 360 as indicated by arrow 320.

FIG. 3 illustrates the multi-level nature of the mapping tables. In the example, the highest order mapping table 380 contains pointers to mapping tables of the next lower order, etc. The lowest order mapping table indicate the location of pages that are swapped in.

When an application program references a page, operating system 108 first attempts to locate the page in physical memory via the mapping tables. If a page is not present in memory, one or more of the mapping tables will contain a "null" value to indicate that the page (or a memory space including the page) is not present. Thus, if a page fault occurs when accessing a page through the mapping tables (i.e., if a null value is encountered in a mapping table while trying to access the page), the associated PMO can be referenced to determine the location of the swapped out page. The page can then be located and swapped into memory. At the time that a page is swapped into memory, the mapping table entries for the page also are filled in to indicate the page's location in memory.

For example, in FIG. 3, if the mapping table 380 has a null pointer for a desired page, it is possible to go directly to PMO 360, since it is associated with mapping table 380. The path beginning with PMO 360 can then be traversed to locate the needed page. It should be understood that every MOR and every mapping table entry contains a value, but only selected MORs and mapping table entries are shown in the Figures for the sake of clarity.

A PMO of span s can be associated with mapping tables whose span is s or greater. Such a PMO can never be associated with a mapping table whose span is less than s. Therefore, for any PMO of span s, we can determine the smallest span of any mapping table that could be associated with the PMO. It is the smallest of the valid mapping table spans that are greater than or equal to s. (It is equal to s, if s is a valid mapping table span).

Likewise, the span of the entries in those smallest mapping tables is the next lower valid mapping table span (or the page span if there is no lower mapping table span). The span of the entries in the smallest mapping table is called the "Mapping Table Reference" (MTR) span.

Thus, for the exemplary PMOs of FIG. 3:

| PMO SPAN | MT Span | MTR SPAN |
|---|---|---|
| $2^{32}$ | $2^{32}$ | $2^{25}$ |
| $2^{27}$ | $2^{32}$ | $2^{25}$ |
| $2^{25}$ | $2^{25}$ | $2^{17}$ |
| $2^{21}$ | $2^{25}$ | $2^{17}$ |
| $2^{17}$ | $2^{17}$ | $2^{14}$ |

FIG. 4 is a diagram showing an exemplary format 400 of a PMO and an exemplary format 450 of a MOR of FIGS. 2 and 3. The PMO format 400 includes a header, which includes an omnibus wired (OW) flag 402; an number of omnibus wired (#OW) field 404; a cached min span code referrer mapping table reference (cached MSCR) field 406; a span 410 of the PMO, a doubly linked list 412 of all MORs that refer to this PMO; and the head of a singly linked list 414 of all the mapping tables that are associated with this PMO. The PMO also includes an array (or table) 416 of MORs that are in this PMO and a number of duplicate references (NumDupRefs) 417, which is the number of MORs that refer to this PMO and have a VCState other than VC Original. In the described embodiment, the PMO has an I/O status of "ROVC" (read only virtual copy) if a number of MORs that refer to this PMO and have a VCState other than VCOriginal (i.e., NumDupRefs field 417) is non-zero.

Each MOR in a PMO has a format 450 shown in FIG. 4. The format 450 of each MOR includes forward and backwards pointers 452 for a doubly linked list of all MORs pointing to this memory object (a MOR can only point to one memory object at a time, but a memory object can be pointed to by more than one MOR). The MOR format 450 also includes a pointer 454 to an object that this MOR points directly to; an offset 456; an "involved bit" 458; a virtual copy state (VCState) 460; and an index 462 of this MOR in the array 416 of the containing PMO. The index is a way to find this MOR's PMO.

FIG. 5 is a diagram showing an exemplary format 500 of an NSKMPage data structure in FIGS. 2 and 3. The term NSKMPage arises because the described embodiment is embodied in the Non-Stop Kernel (NSK) operating system, available from Tandem Computers of Cupertino Calif. Other non-Tandem nomenclature can, of course be used. In the example of FIG. 3, each NSKMPage represents 14 address bits. Thus, in the example, the span of each NSKMPage is $2^{14}$.

A NSKMPage data structure includes a doubly linked list 504 of all MORs that refer to this NSKMPage data structure. The NSKMPage data structure includes a field 505 that contains the number of MORs that refer to this NSKMPage data structure that are duplicates or subduplicates. The NSKMPage data structure also identifies a location 506 of the physical page corresponding to this NSKMPage data structure and an omnibus wired count field 508. The omnibus wired count field contains the number of active requests to omnibus wire this page. The page is omnibus wired if and only if this field is non-zero.

FIG. 6 is a diagram showing an exemplary format 600 of a mapping table of FIGS. 2 and 3. The mapping table format 600 includes a pointer 602 to the PMO that is associated with this mapping table. For example, PMO 360 is associated with mapping table 380 (as shown by dotted line 320 in FIG. 3). Note that not all PMOs are associated with a mapping table. The mapping table also includes a forward pointer 603 for a singly linked list of all mapping tables associated with the PMO that is associated with this mapping table, and Omnibus wiring complete flag 604, and an array of pointers 605 to next-lower-order mapping tables (or, for the lowest level mapping tables, to pages).

FIG. 7(a) is a diagram illustrating how processes can share memory. As shown in FIG. 7(a), MORs of a process A 702 can point to a memory object 707 of a process B 704 and thus share that portion of the memory of process B. As also shown in FIG. 7(a), processes A and B also share a mapping table 709 in a similar manner.

Figure 7B:
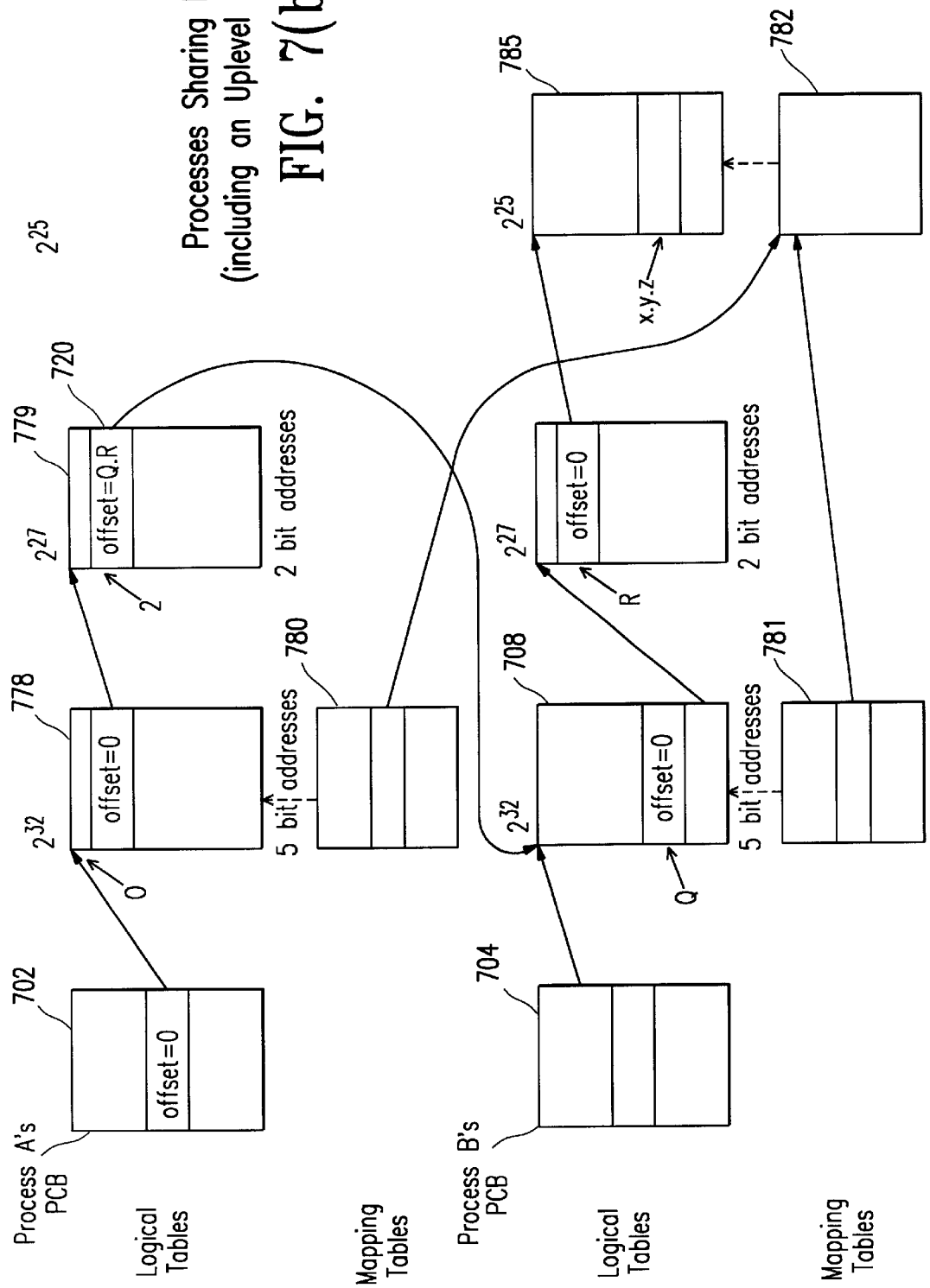
FIG. 7(b) is a diagram illustrating an uplevel reference.

FIG. 7(b) is a diagram illustrating the concept of an "uplevel reference." In the example, the uplevel reference is a MOR 720, which normally refers to a first area of memory ($2^{25}$). MOR 720 shares memory with a second memory object 708 having a second, larger area of memory ($2^{32}$).

The situation of FIG. 7(b) might arise, for example, if process A 702 is a debugger computer program that is debugging process B 704. Since process A needs to look at process B's memory, process A shares a portion of the address space of process B. MOR 720 points to PMO 708, so $2^{25}$ units of process B's address space is shared by process A. Any changes to B's address space are reflected in what process A sees. As also shown in FIG. 7(b), processes A and B also share a mapping table 782 in a similar manner. Note that the mapping table 780 of process A points to a next smaller size mapping table 782.

Figure 7C:
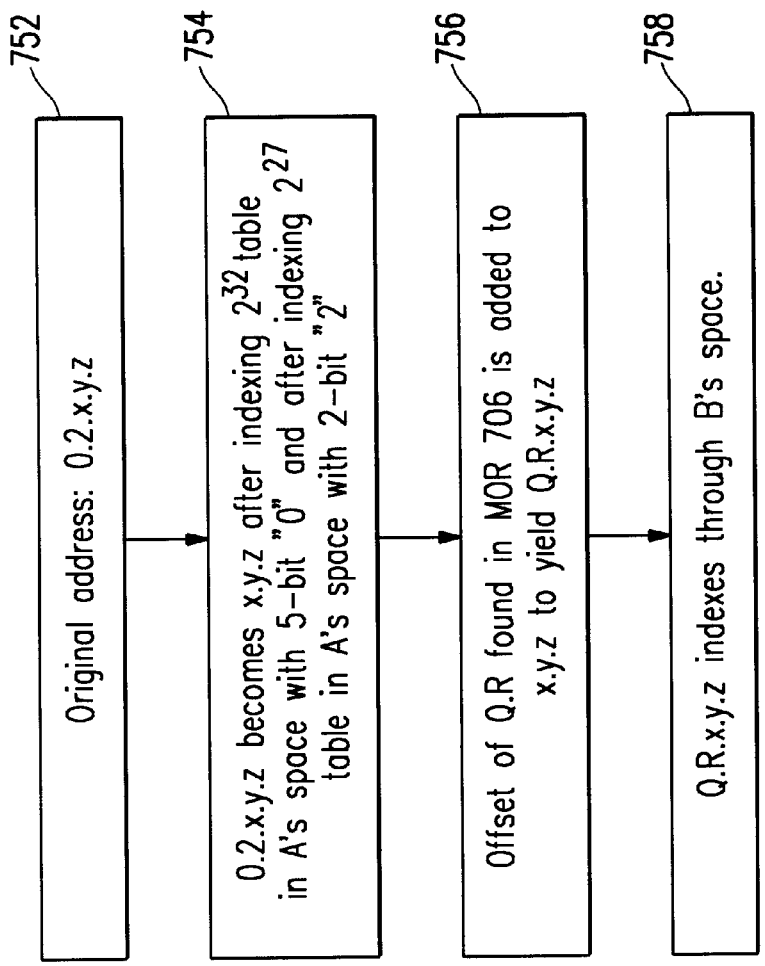
FIG. 7(c) is a flow chart explaining how a preferred embodiment of the present invention handles an uplevel reference.

FIG. 7(c) is a flow chart showing an example of how addressing is handled for an uplevel reference, such as the uplevel reference of FIG. 7(b). In the example, step 752 shows that the original address is 0.2.x.y.z. Step 754 shows that 0.2.x.y. becomes x.y.z after indexing $2^{32}$ table 778 in A's space with 5-bit "0" and after indexing $2^{27}$ table 779 in A's space with 2-bit "2". Step 756 shows that the offset of Q.R found in MOR 720 is appended to x.y.z to yield Q.R.x.y.z. Step 758 shows that the address Q.R.x.y.z indexes through B's address space. Of course, the address Q.R.x.y.z can only address a part of size $2^{25}$ of B's address space. Thus, the uplevel reference in MOR 720 has a span of $2^{25}$.

III. Omnibus Wiring

The described embodiment of a virtual memory system allows a page in memory to be "omnibus wired." If a page is marked as being omnibus wired, the page is guaranteed to be physically mapped in all addressing paths in which it appears. Because the described embodiment allows processes to share memory, a single page may be mapped in more than one addressing path. Omnibus wiring is used, for example, when a page needs to be "locked."

Omnibus wiring of a page guarantees that the locked page is present in memory and that all mapping tables pointing to the omnibus wired page's location are present and filled in (set up) for all possible address references to the page. If a page is omnibus wired, the page and the mapping tables that reference the omnibus wired page should never be allowed to be swapped out. Thus, it is important to mark all paths to an omnibus wired page to ensure proper operation of omnibus wiring in a system that allows processes to share memory. Even if the memory is not shared when the page is omnibus wired, it is important to keep in mind that an omnibus wired page may become shared at a later date.

a. Marking as Omnibus Wired

Figure 9B:
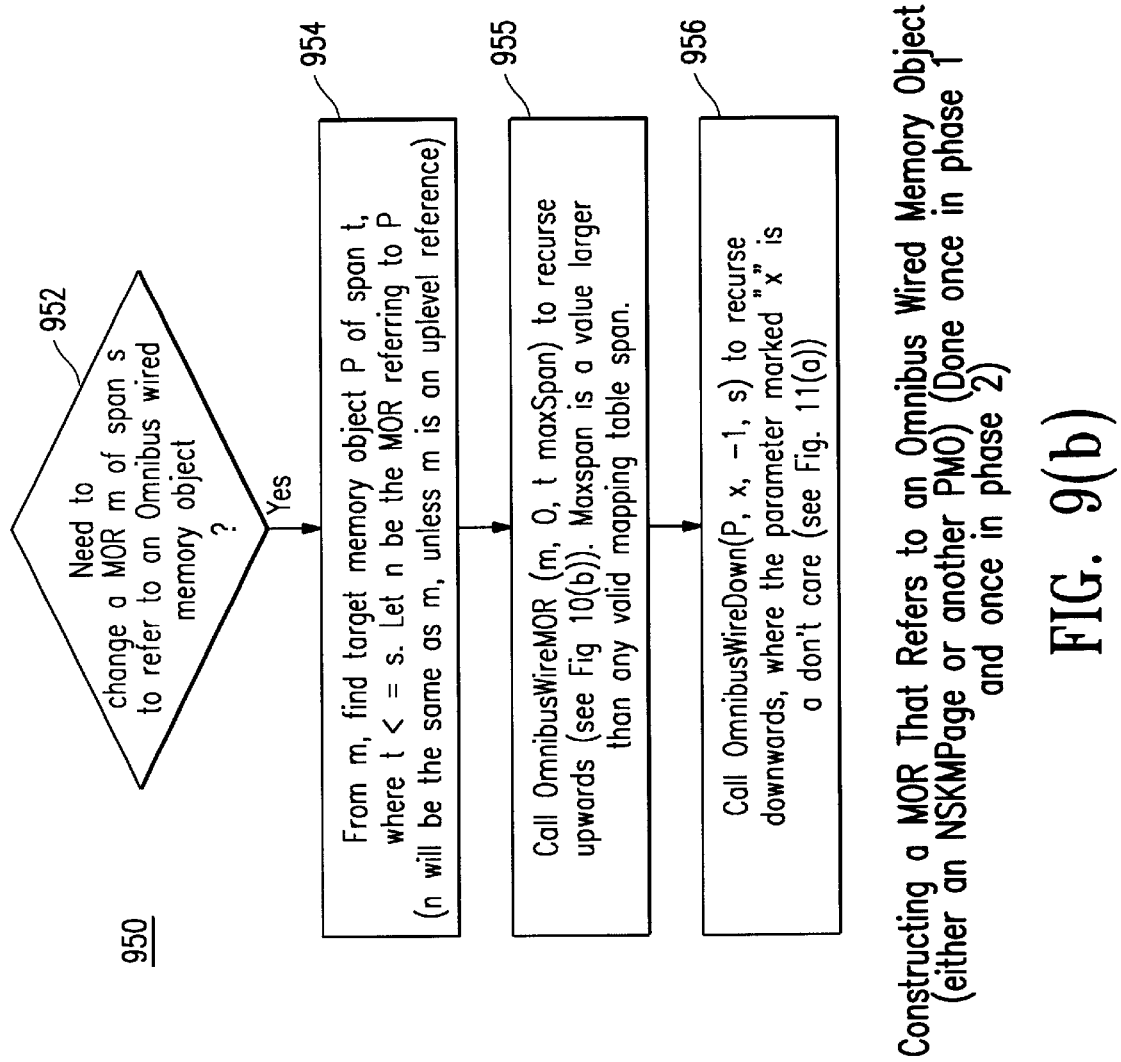
FIG. 9(b) shows steps to construct a MOR that refers to an omnibus wired memory object.

In the described embodiment, omnibus wiring can be invoked under two circumstances: 1) when a request is received by operating system 108 that a page should be omnibus wired (see FIG. 9(a)) and 2) when a new mapping is created that leads to a page that is already omnibus wired (i.e., when a MOR is changed to point (directly or indirectly) to a page that is already omnibus wired) (see FIG. 9(b)). This second situation occurs, for example, when two processes share a memory space.

As shown in FIG. 4, each PMO contains an omnibus wired (OW) flag 402, which indicates that at least some downstream memory objects are already omnibus wired, i.e., that all mapping tables are actually filled in and that the corresponding pages are present in memory for at least some of the memory objects that can be addressed via the PMO. When a MOR of another PMO is altered to point to a PMO with its omnibus wired flag set, it is necessary to check whether the altered PMO also need to be omnibus wired.

An original PMO is referred to by MORs contained in other PMOs. Those other PMOs in turn are referred to by MORs contained in yet other PMOs, etc. All these other PMOs are considered to refer (directly or indirectly) to the original PMO. (Note that all these other PMOs are included, even though (due to uplevel references) there may not be any actual address that would lead from such other PMO to the original PMO).

The "true Min Span Code Referrer Mapping Table reference" ("true MSCR") of a PMO is the smallest of the Mapping Table Reference span (defined above) of all PMOs that refer (directly or indirectly) to the PMO. The true MSCR of a PMO can be determined recursively. In order to reduce the calculation required to determine the true MSCR, the "cached MSCR" field 406 in each PMO is used to cache the determined value of the true MSCR for that PMO. When the true MSCR of a PMO is known, it is stored in the cached MSCR field 406 of the PMO. Otherwise, the cached MSCR field 406 has a distinctive value indicating that the field is not a valid indication of the true MSCR value.

Whenever any change occurs that could affect the true MSCR of a PMO, the cached MSCR field 406 of the PMO must be updated. For example, when a MOR referring to the PMO is changed to no longer refer to the PMO, the true MSCR of the PMO could be affected, so the cached MSCR field is invalidated. For another example, when the cached MSCR field of an original PMO changes (including any change that invalidates the field), the cached MSCR fields of all other PMOs that are referred to (directly or indirectly) by the original PMO must also be changed accordingly.

The cached MSCR field 406 is used to determine whether it is necessary to continue recursing upwards when omnibus wiring a MOR, since there is a special case associated with "uplevel references" and omnibus wiring, as described below in connection with FIGS. 16 and 17 and the flow chart of FIG. 10.

As further shown in FIG. 4, each PMO also contains a #OW (number of omnibus wirings) field 404. The #OW field 404 contains the number of memory objects the PMO refers to that are omnibus wired. If the PMO refers to zero omnibus wired memory objects, then the PMO itself should not be omnibus wired. Thus, the #OW field 404 is maintained while memory objects are being omnibus wired and used when objects are de-omnibus wired. When the #OW field is "0", a PMO stops becoming omnibus wired.

Figure 8:
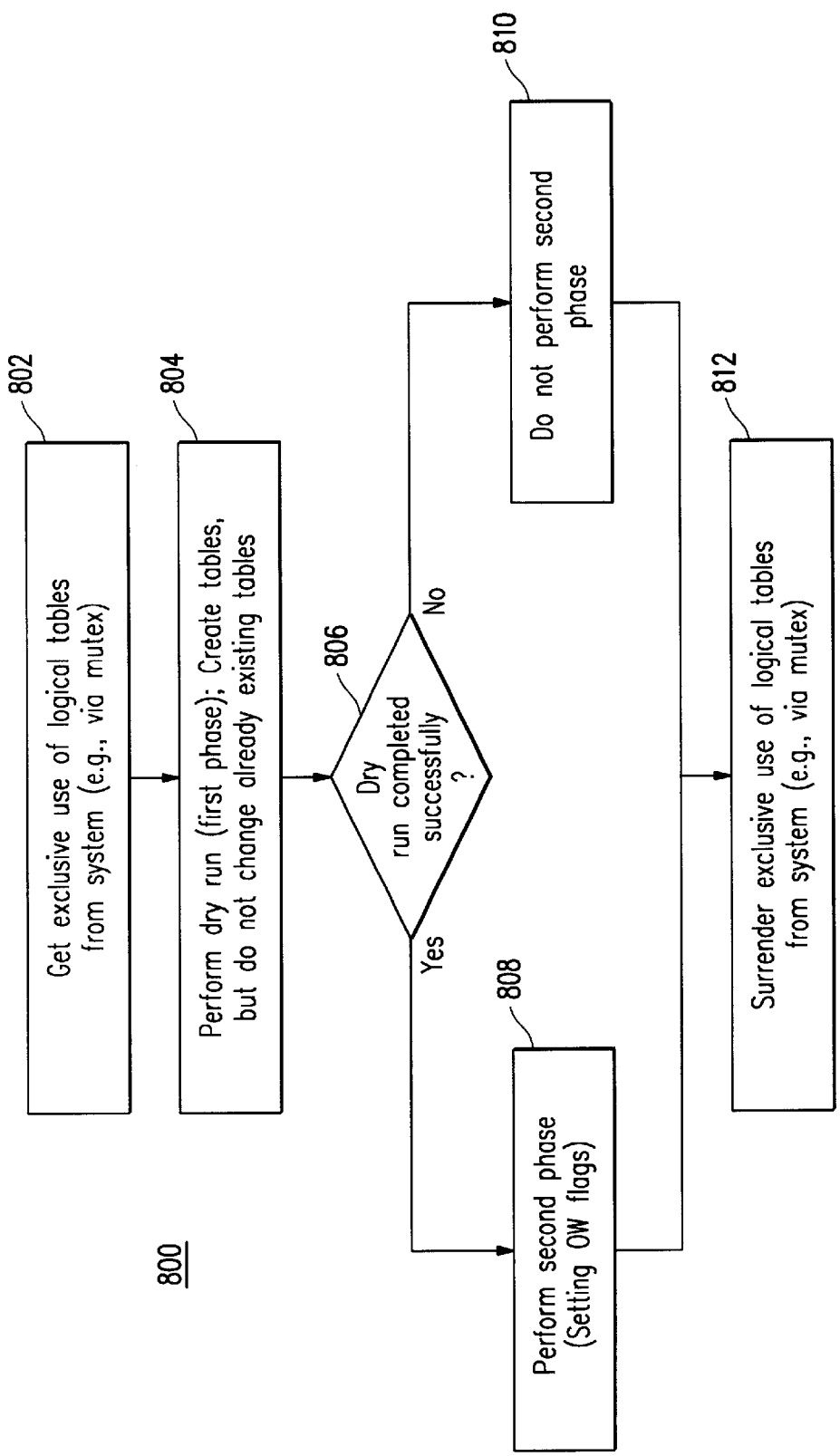
FIG. 8 is a flow chart showing an overview of a preferred embodiment of the omnibus wiring process.

FIG. 8 is a flow chart showing an overview of a preferred embodiment of the omnibus wiring process. As shown in the Figure, a preferred embodiment of the present invention performs omnibus wiring in two phases: a first phase and a second phase. Furthermore, in a preferred embodiment of the present invention, the operating system 108 first obtains exclusive use (or the exclusive ability to change) the logical and physical tables. Exclusive use is granted, for example, through a mutex, as is known in the art and as shown in step 802.

As shown in step 804, the first phase involves a "dry run." The dry run sets up all needed pages and tables, but does not change the existing tables. If the dry run completes successfully in step 806, then the second phase is performed in step 808. Otherwise, the second phase is not performed (step 810). (Although error recovery is not shown explicitly, appropriate methods of error recovery will be obvious to persons of ordinary skill in the art). The second phase in step 808 sets up the mapping tables and PMOs in accordance with the work done in the first phase. In this embodiment, two phases are used in case there is a problem, such as a problem allocating tables in memory, during the first phase.

As shown in FIG. 8, the omnibus wired (OW) flag 402 (see FIG. 4) in each affected PMO is set during the second phase in step 808. In addition, each mapping table also has an OW Complete flag 604 that indicates whether the mapping table is correctly set up for omnibus wiring. OW Complete flag 604 in the mapping tables is necessary because, while recursing down in the dry run, a mapping table could be created, but the dry run could run out of memory space before it completes. While the dry run is waiting for memory space to become available, it leaves the new mapping table marked as "not omnibus wired," so that the next time the mapping table is accessed, its status is clear.

In the following discussion, an "MTR" is a mapping table reference in a mapping table. The "span" of a mapping table reference is the span of the mapping table or page to which it refers.

In general, the omnibus wired flag 402 in a memory object is set when the memory object "leads to" an omnibus wired page in memory. The term "leads to" means that some address relative to the PMO maps to the page. Note that it is possible for a PMO to contain a MOR that refers to an omnibus wired memory object, but the PMO does not "lead to" any omnibus wired page. This can happen, for example, if the MOR contains an uplevel reference (see FIGS. 16 and 17) that selects a portion of the memory object that does not contain any omnibus wired pages. Thus, determining whether a PMO is omnibus wired is not a simple matter of counting the number of MORs in the PMO that refer to other omnibus wired memory objects.

Figure 10A:
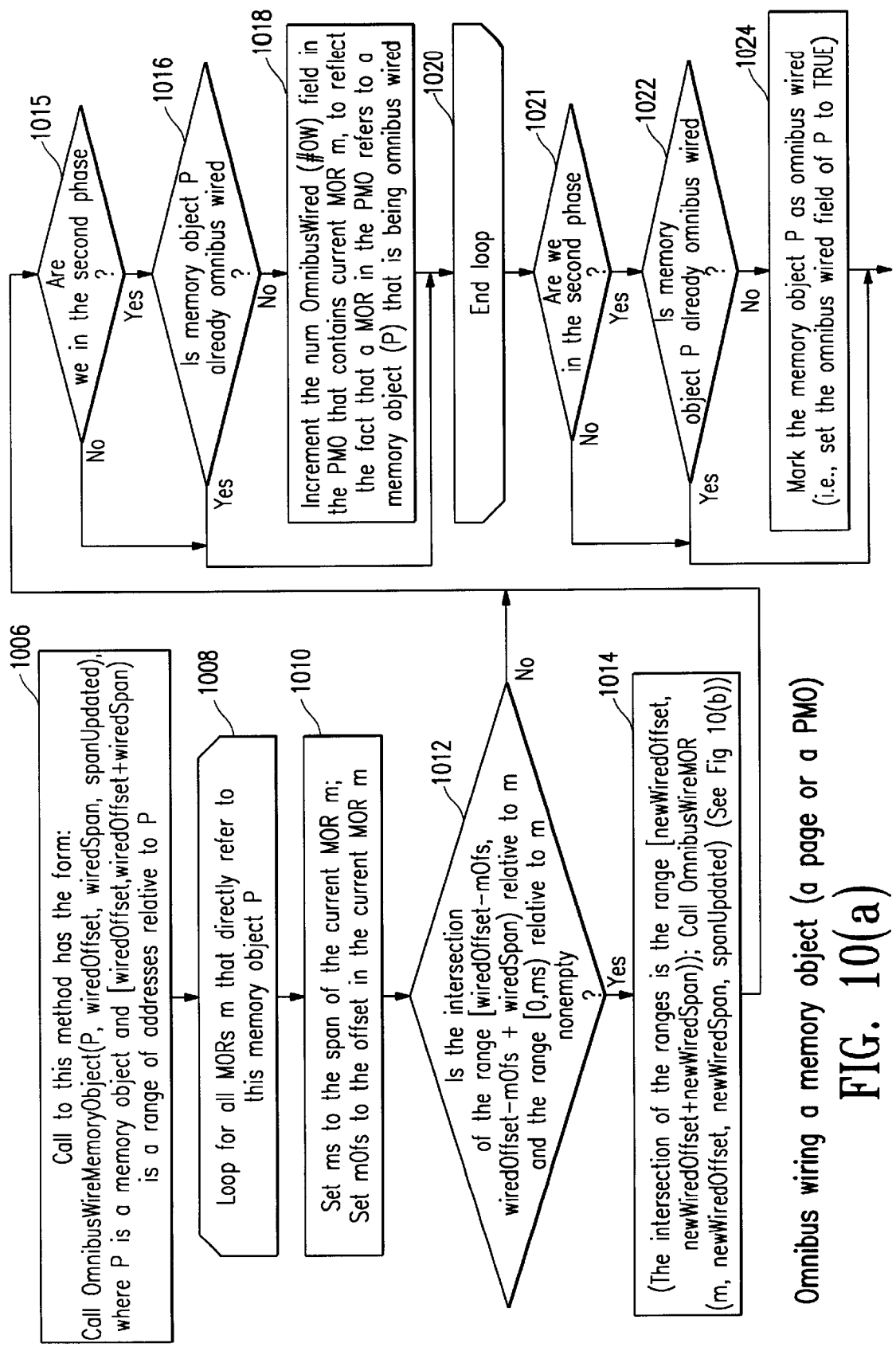

FIG. 9(a) is a flow chart showing steps to omnibus wire a page P of span s. As an initial matter, step 902 determines whether a page P needs to be omnibus wired. If so, step 903 calls the procedure OmnibusWireMemoryObject, which is shown in FIG. 10(a) and discussed below in detail.

FIG. 9(b) is a flow chart showing steps to construct a MOR m of span s that refers to an omnibus wired memory object. The steps of FIG. 9(b) are performed twice, once for the first phase (dry run) and once for the second phase. As an initial matter, step 952 determines whether MOR m of span s needs to be changed to refer to an omnibus wired memory object. First, step 955 searches "upstream" of the MOR to allocate any needed mapping tables. The first phase allocates these mapping tables and the second phase fills them. Step 955 calls the procedure OmnibusWireMOR, which is described below in connection with FIG. 10(c). Second, in step 956 a downward search is performed to take care of a special circumstance involving read-only (or global) attributes, as described below in more detail. Step 956 calls the procedure OmnibusWireDown, which is described below in connection with FIGS. 11(a)–11(d). Prior to steps 955 and 956, step 954 finds from MOR m, the first memory object P of span t addressed by MOR m, where t<=s. Step 954 refers to the MOR referring to memory object P as MOR n. MOR n will be the same as MOR m, unless there is an uplevel reference.

FIGS. 10(a) through 10(e) are flow charts showing the upward recursion steps of the omnibus wiring processes of FIGS. 8 and 9. In general, the method recurses upwards from an initial MOR, marking each PMO encountered as omnibus wired. As long as the PMOs encountered are not omnibus wired, the method needs to continue. Even if, however, a PMO is encountered that is already omnibus wired, the method cannot necessarily stop at that PMO because of the special situation involving uplevel references described in connection with FIGS. 16 and 17.

FIGS. 11(a)–11(d) are flow charts showing steps to recurse downward through tables during the omnibus wiring process of FIG. 9(b). At first glance, there is no need to recurse downward, since all PMOs below a certain PMO marked as omnibus wired should already be omnibus wired. There is a special case, however, that requires downward recursion. In the described embodiment, it is possible for a page to be designated as "read only." This indication is located in the page table and requires special handling.

i) A first example

Figure 13:
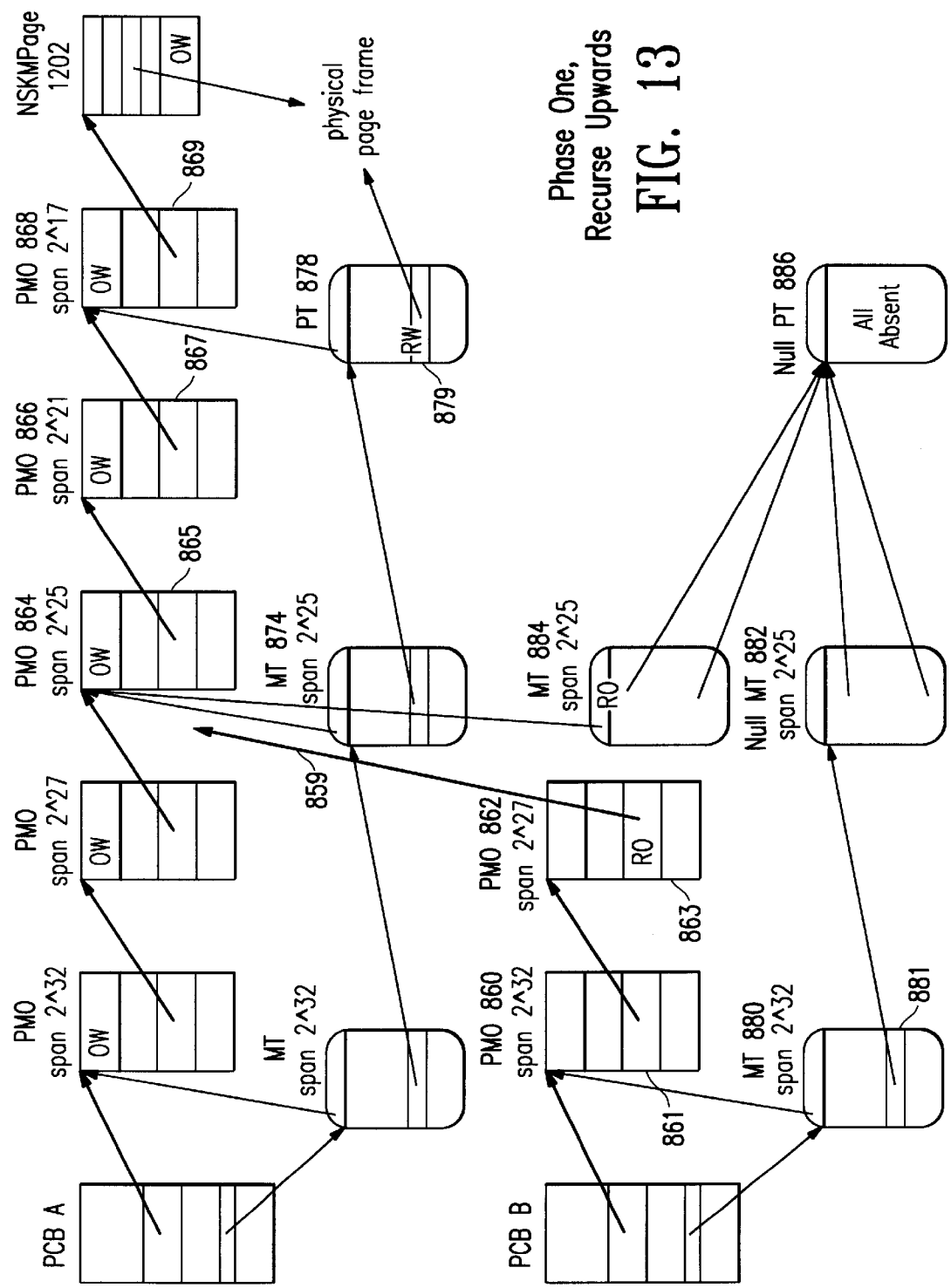
FIGS. 13–15 are diagrams showing additional steps in the omnibus wiring example of FIG. 12.
Figure 14:
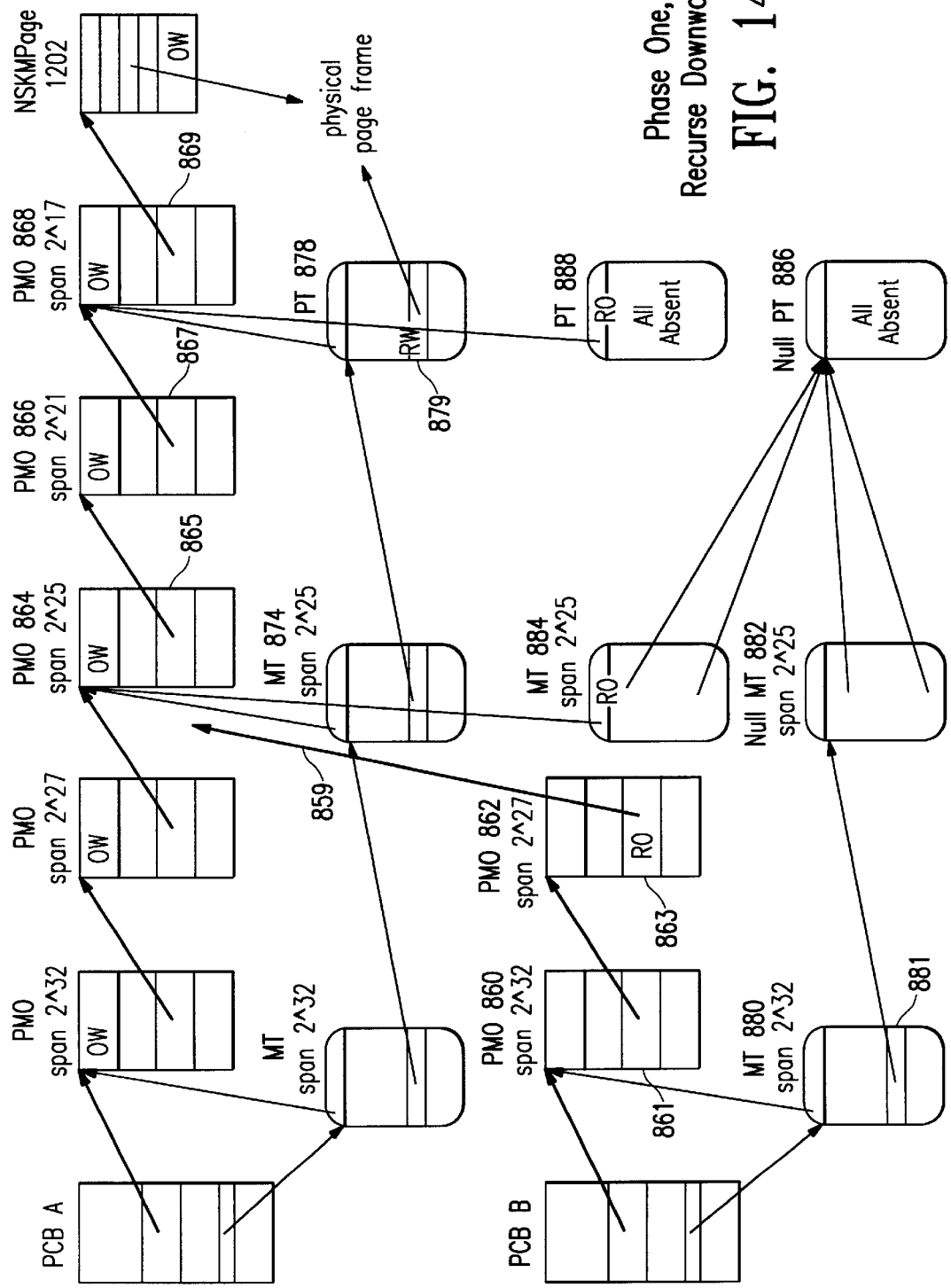
Figure 15:
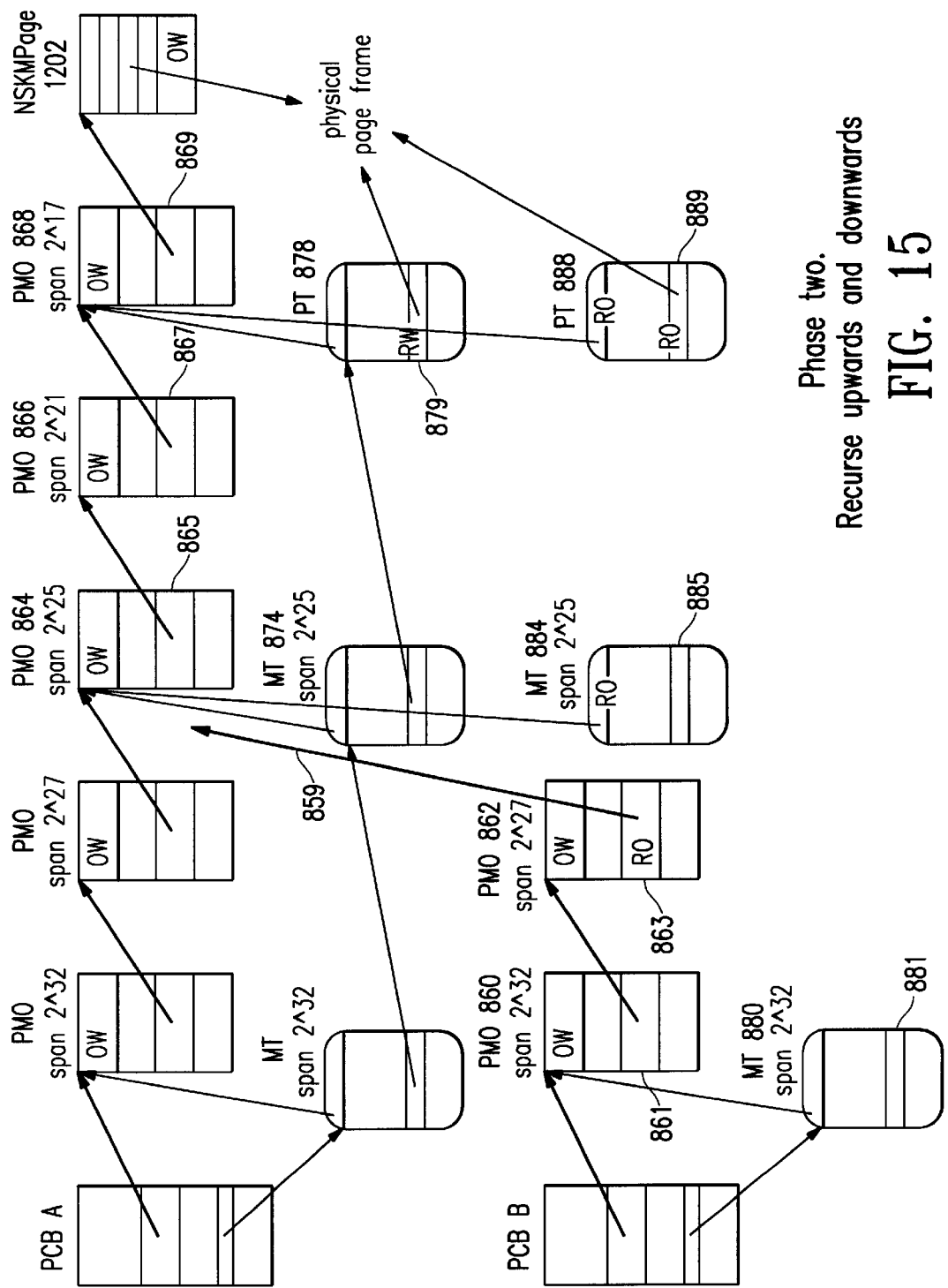

FIGS. 12–15 provide an example of omnibus wiring. Specifically, these Figures show steps performed when process B begins to share memory with process A. To effect this sharing, a MOR 863 in PMO 862 of process B is to be altered to point to a PMO 864 of process A. Note that the memory space referenced by MOR 863 has been designated as "read only" by process B, as indicated by the "RO" in MOR 863, while at least one page in this space has been designated as "read write" by process A (see page table 878, which designates the page as "RW" 879). Because at least one page 1202 referenced by PMO 864 was previously omnibus wired (as indicated by the OW_flag of PMO 864), it is necessary to set the omnibus wired flags in the address path including PMO 862 when memory is shared. FIGS. 13–15 are described with reference to the steps of FIGS. 10(a)–10(e) and FIGS. 11(a)–11(d).

FIG. 13 shows the result of upward recursion from MOR 863 of PMO 862 in the first phase/dry run of omnibus wiring. This example is described with reference to the steps of FIGS. 9(b) and 10(a)–10(e). FIG. 14 shows the result of downward recursion from PMO 862 in the first phase/dry run of omnibus wiring. This example is described with reference to the steps of FIGS. 9(b) and 11(a)–11(d). FIG. 15 shows the result of upward and downward recursion from PMO 862 in the second phase of omnibus wiring. This example is described with reference to the steps of FIGS. 10 and 11.

The following discussion relates to the example of FIG. 13 and the upward recursion steps for MOR 863. In step 954, m is MOR 863, s is $2^{25}$, P is PMO 864, t is $2^{25}$, and n is also MOR 863. Step 955 calls OmnibusWireMOR in FIG. 10(b). In step 1032, wiredOffset is set to zero and wiredSpan is set to $2^{25}$.

Figure 10C:
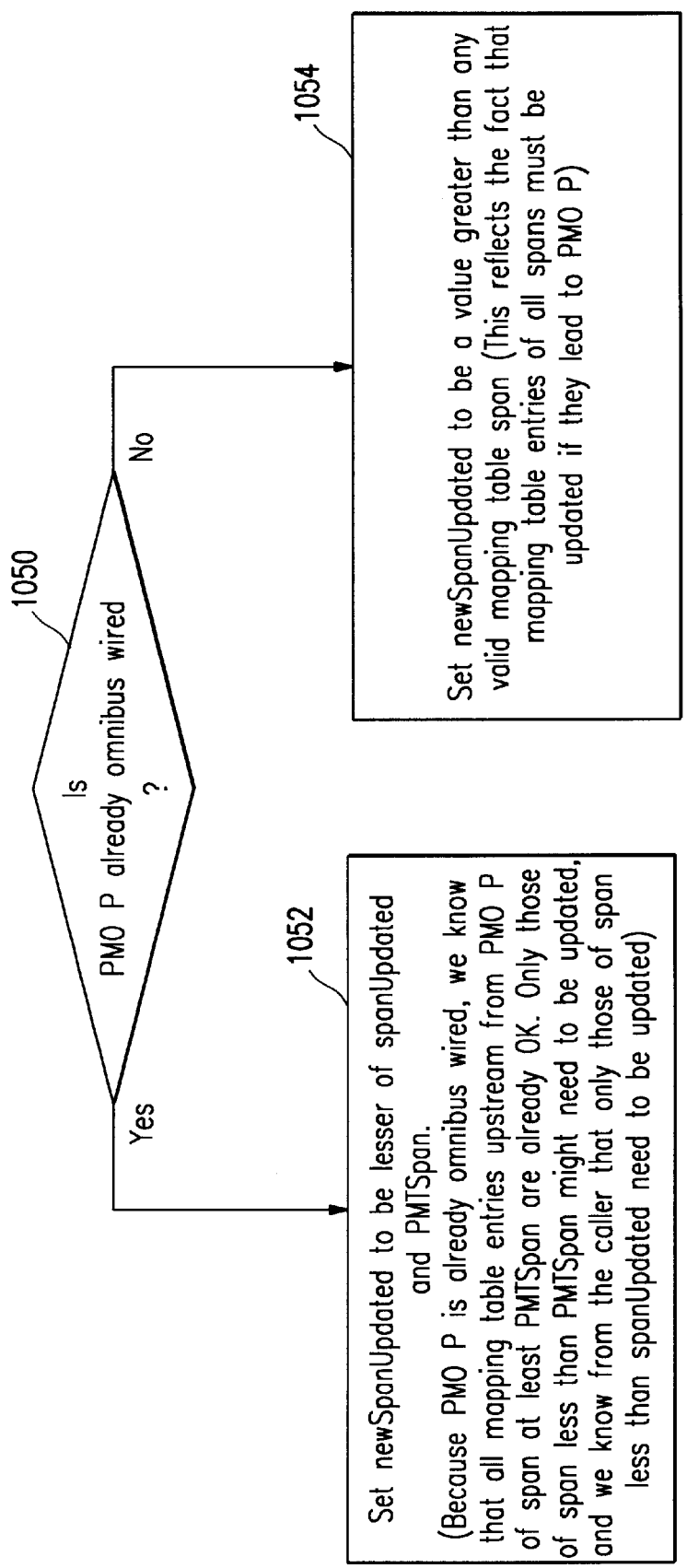
Figure 10E:
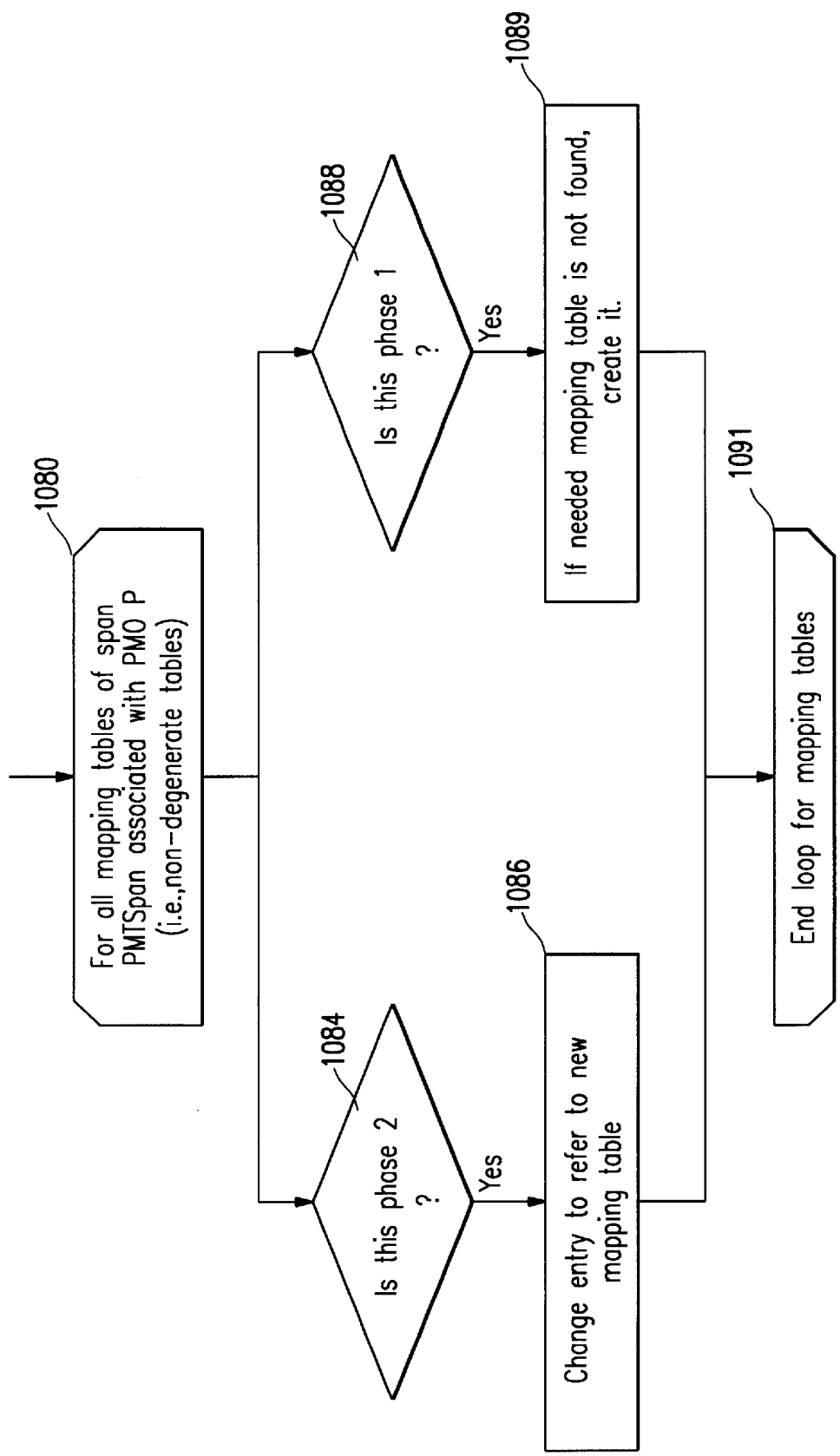
Figure 11A:
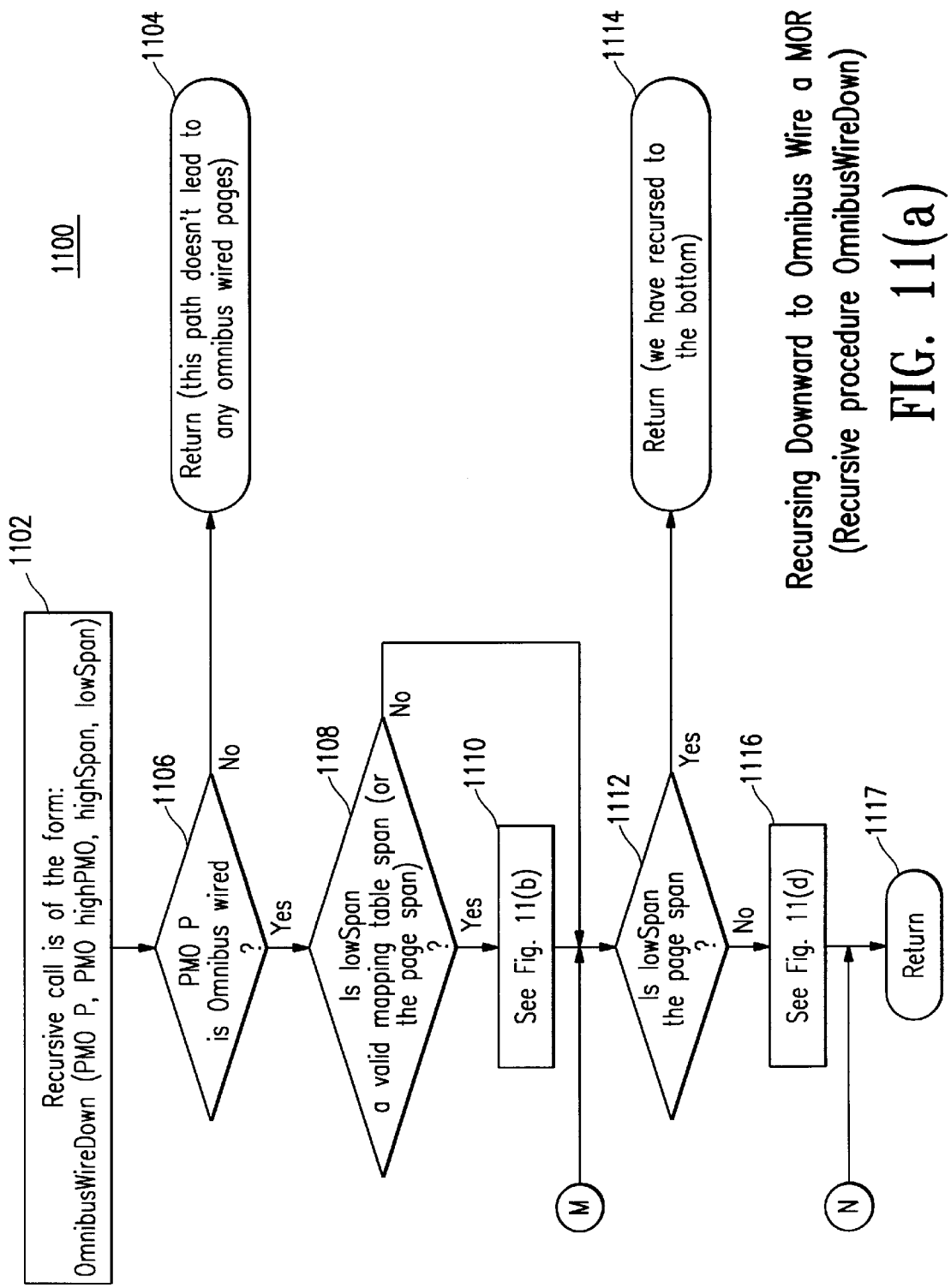
FIGS. 11(a) through 11(d) are flow charts showing steps to recurse downward through tables during the omnibus wiring process of FIG. 8.
Figure 11B:
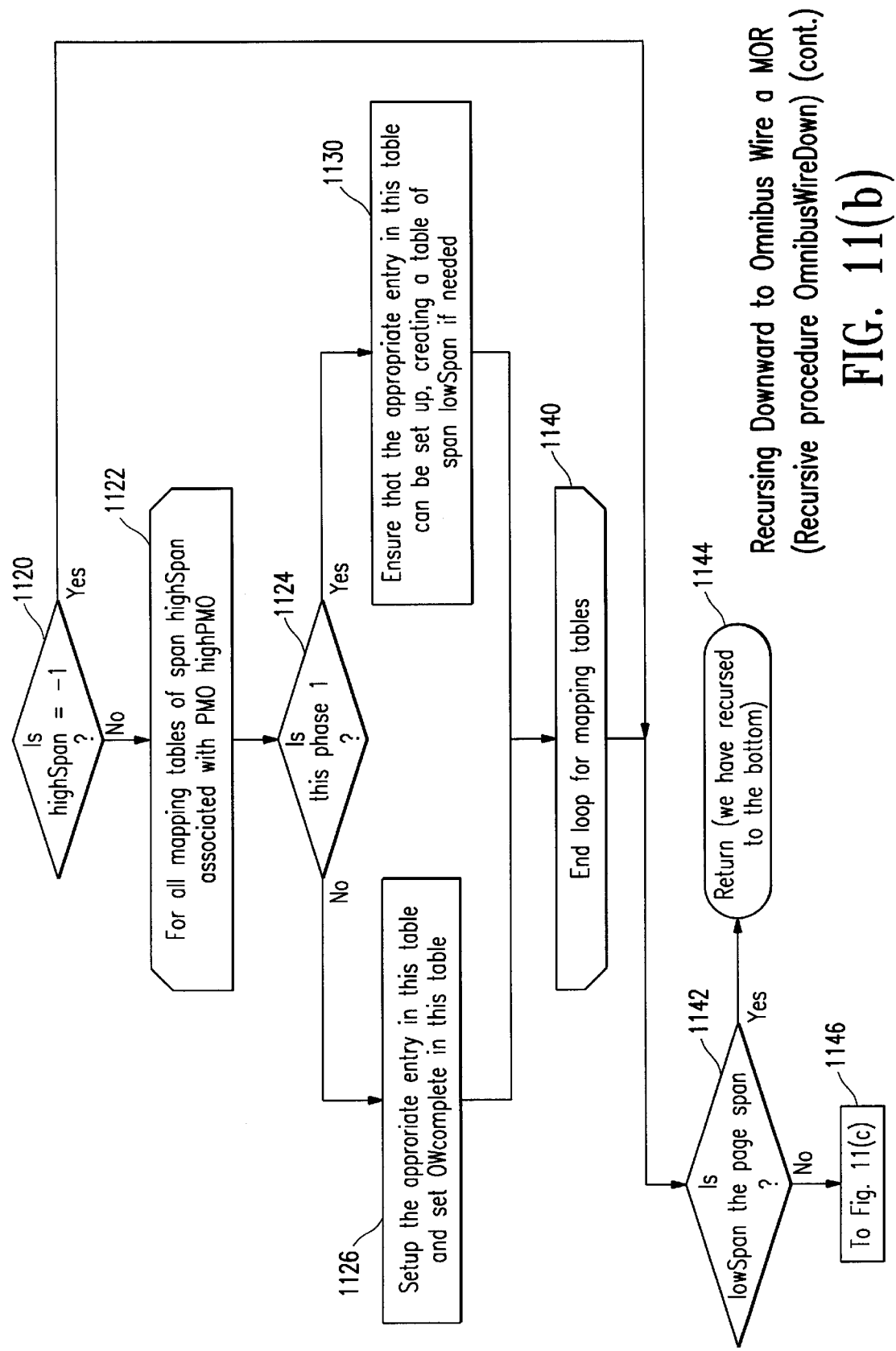
Figure 11C:
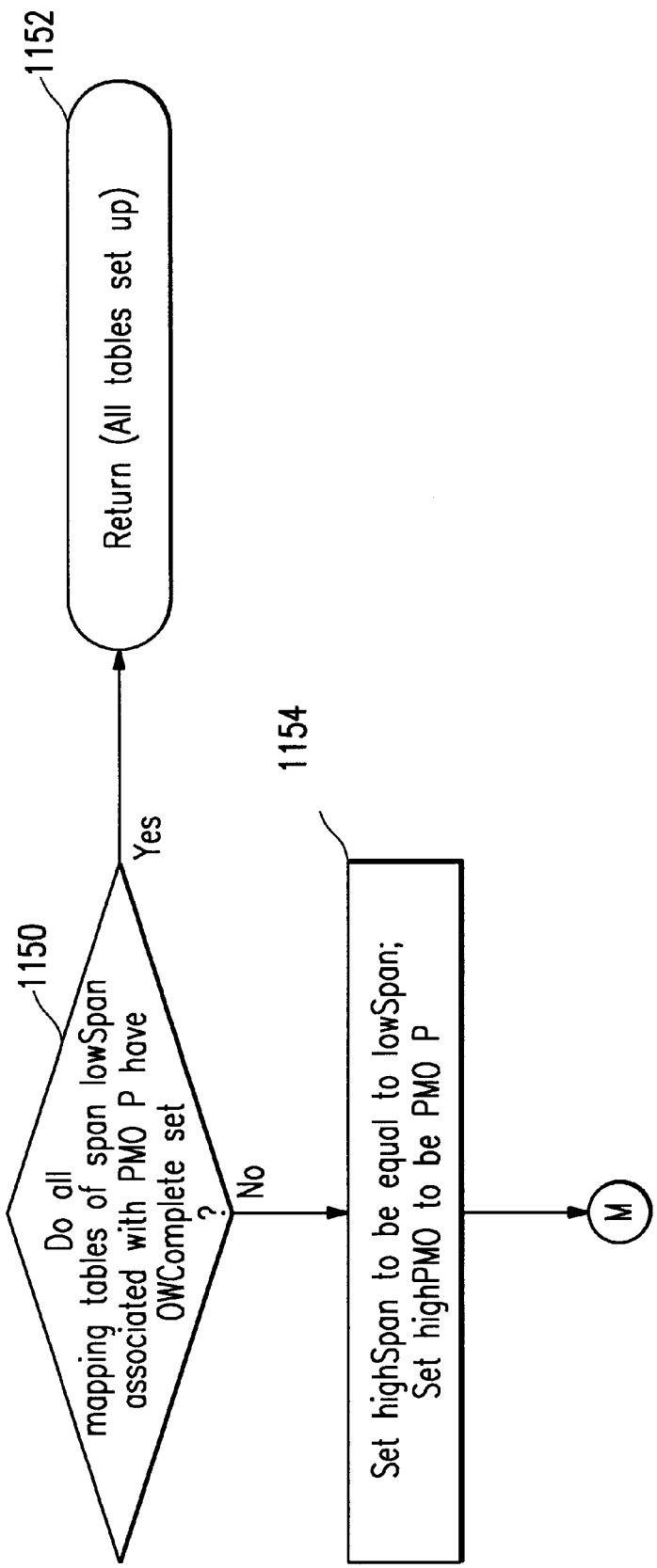
Figure 11D:
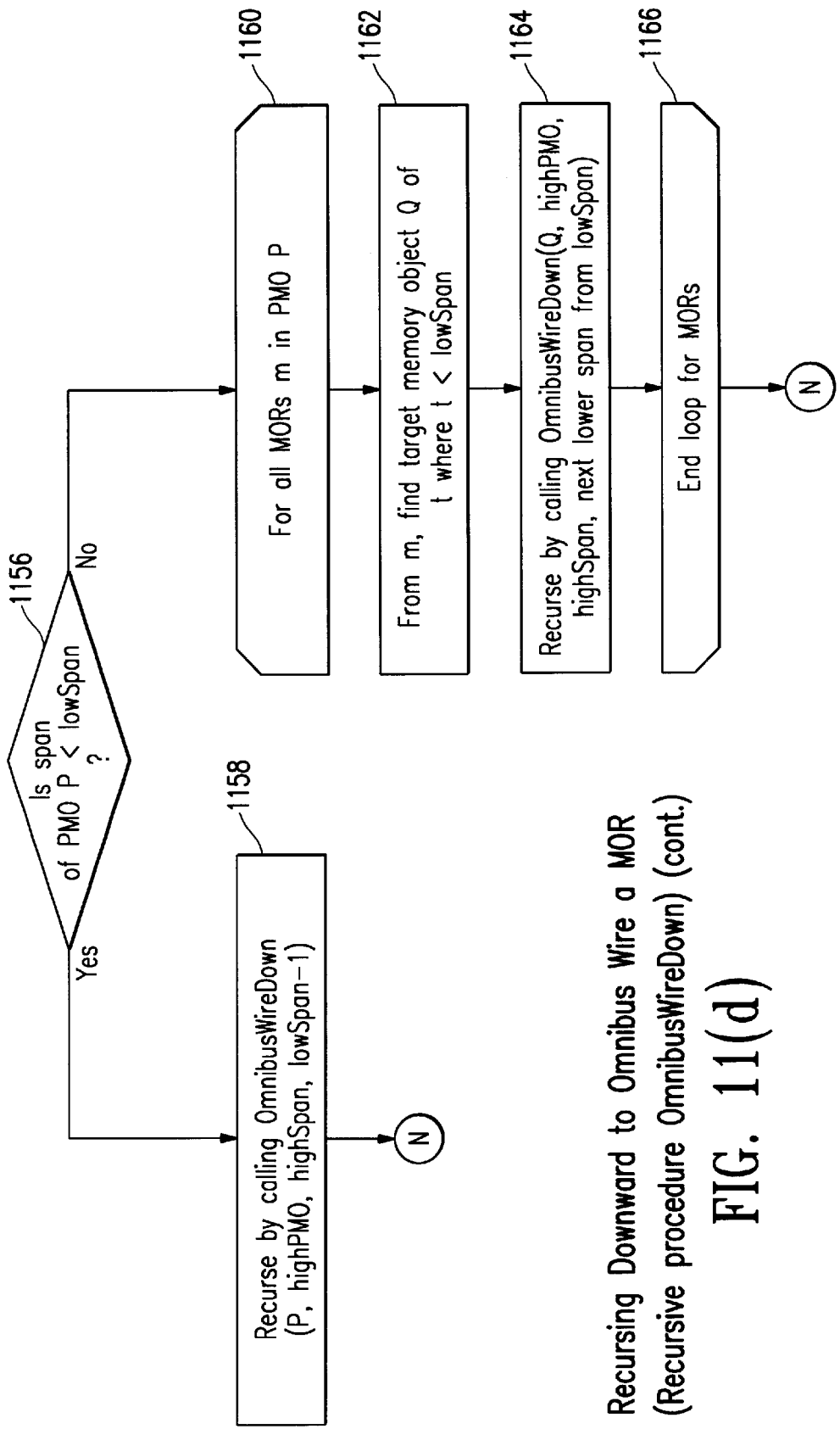
Figure 12:
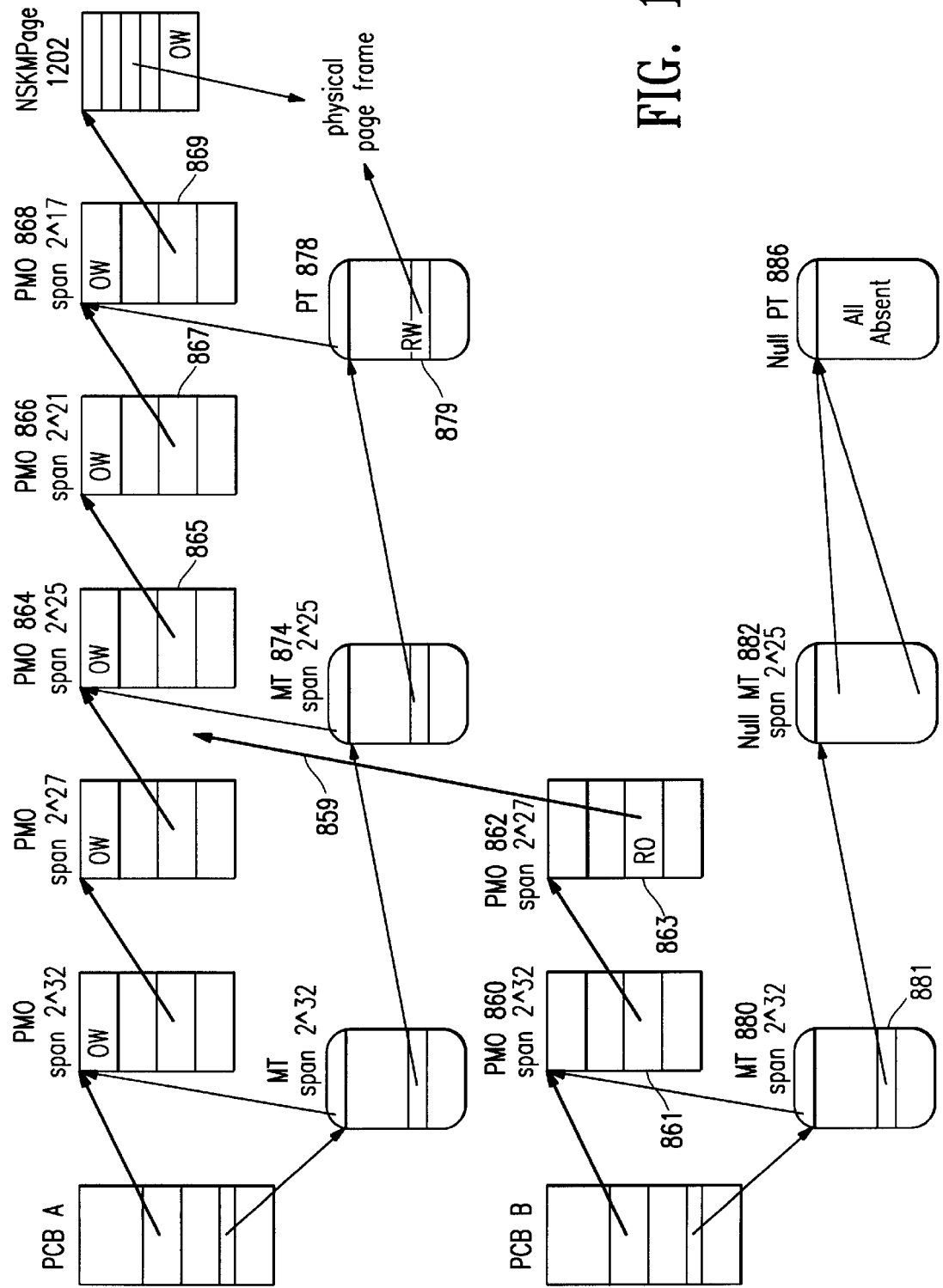
FIG. 12 is a diagram showing an initial step in an omnibus wiring example.

In step 1036, PMO P is set to be PMO 862 that contains MOR 863. PMTSpan is set to $2^{32}$, which is the span of the smallest mapping table that could be associated with PMO 862. MIndex is set to the product of the index of MOR 863 and the span $2^{25}$ of MOR 863. NewSpanUpdated is determined to be a value greater than any valid mapping table span (e.g., "infinity"), as shown in FIG. 10(c). The true MSCR of PMO P is determined (as described in FIG. 10(d)) to be $2^{25}$. Thus, the determination in step 1038 is true. Control passes to step 1040, which calls the procedure OmnibusWireMemoryObject (see FIG. 10(a)).

In step 1006 of FIG. 10(a), PMO P is set to be PMO 862, wiredOffset is set to the product of the index of MOR 863 and $2^{25}$, wiredSpan is set to $2^{25}$, and spanUpdated is set to "infinity."

In step 1008, MOR 861 is the only MOR that refers to PMO 862. In step 1010, ms is set to the span of MOR 861, i.e., $2^{27}$, and mOfs is set to zero. In steps 1012 and 1014, the range [wiredOffset, wiredOffset+$2^{25}$) is a subset of the range [0,ms), so the intersection is [wiredOffset, wiredOffset+$2^{25}$). A recursive call is then made to OmnibusWireMOR.

In step 1032 of FIG. 10(b), MOR m is MOR 861, wiredOffset is set to the product of the index of MOR 863 and $2^{25}$, and wiredSpan is set to $2^{25}$.

In step 1036, PMO P is set to PMO 860, PMTSpan is set to $2^{32}$, MIndex is set to the product of the index of MOR 861 and $2^{27}$. NewSpanUpdated is again set to "infinity." The true MSCR of PMO 860 is calculated to be $2^{32}$. From step 1038 control passes to step 1040, which performs another recursive call on OmnibusWireMemoryObject. In this example, in phase one, this call has no effect. (In phase two it will mark PMO 860 as omnibus wired.)

Control passes to step 1042 and then to step 1046. Details of step 1046 are shown in FIG. 10(*e*).

In step 1046, as shown in the flowchart of FIG. 10(*e*), control loops over all the mapping tables associated with PMO P of span PMTSpan (i.e., all non-degenerate tables). (Some of these mapping tables may have been created in previous recursion steps). In this example, there is only one mapping table mapping table 880 associated with PMO 860, and it does have span $2^{32}$.

In each such table, we consider the entries that need to be set up. These entries are the ones that map addresses in the range [wiredOffset+MIndex, wiredOffset+MIndex+wiredSpan). In this example, entry 881 needs to be set up. From examining MOR 861, PMO 862, and MOR 863, we determine that entry 881 needs to be set up to refer to a read-only mapping table of span $2^{25}$ associated with PMO 864.

In phase one, step 1089 looks for the mapping table we need; if a mapping table is not found, step 1046 creates it. We cannot use mapping table 874 because it is not read-only, so we create mapping table 884. Step 1046 does not change entry 881 to refer to mapping table 884 until phase two (see step 1086).

In step 1014 of FIG. 10(*a*), the call to OmnibusWireMOR returns, and control passes to step 1015. Because this is phase one, we skip steps 1016, 1018, 1022, and 1024, and return from the call to OmnibusWireMemoryObject in step 1040 of FIG. 10(*b*). Recall that at this point PMO P is PMO 862. Steps 1042 and 1046 have no effect because PMO 862 has no associated mapping tables. Control then returns from the call to OmnibusWireMOR in step 955. This concludes the upward recursion in phase one.

The following discussion relates to the example of FIG. 14 and the downward recursion of FIG. 11. Step 956 of FIG. 9(*b*) calls OmnibusWireDown of FIG. 11(*a*). In step 1102, PMO P is PMO 864, highSpan is −1 and lowSpan is $2^{25}$. In steps 1106 and 1108, since PMO 864 is omnibus wired (OW flag is set) and $2^{25}$ is a valid mapping table span, control passes to FIG. 11(*b*).

Steps 1120 and 1142 of FIG. 11(*b*) determine that highSpan is equal to −1 and lowSpan is not the page span (it is larger than the page span), so control passes to FIG. 11(*c*). Step 1150 examines all the mapping tables of span $2^{25}$ associated with PMO 864, namely mapping table 874 and mapping table 884. Mapping table 884 does not have OW Complete set, which indicates that it is not yet properly set up for omnibus wiring. Control passes to step 1154, highSpan is set to $2^{25}$, and highPMO is set to PMO 864. Then control returns to step 1112 of FIG. 11(*a*).

Step 1112 determines that lowSpan (still $2^{25}$) is not the page span, so control passes to FIG. 11(*d*). Step 1156 of FIG. 11(*d*) determines that the span of PMO 864 (i.e., $2^{25}$) is not less than lowSpan (i.e., $2^{25}$), so control passes to step 1160. (Step 1158 is only used if there is a downlevel reference, which in this example, there is not). In step 1160, control loops over all the MORs in PMO 864. For simplicity, only the one MOR 865 is shown and discussed.

In step 1162, when MOR m is MOR 865, from MOR 865, target memory Q is PMO 866, because the span of PMO 866 is $2^{21}$, which is less than lowSpan, i.e., less than $2^{25}$. Step 1164 recursively calls OmnibusWireDown.

In step 1102 of FIG. 11(*a*), PMO P is PMO 866 and lowSpan is $2^{21}$. Eventually, control will recurse again; PMO P will be PMO 868, highPMO will be PMO 864, highSpan will be $2^{25}$, and lowSpan will be $2^{17}$. Step 1106, 1108, 1110, 1120, and eventually 1122 are then executed. In step 1122 of FIG. 11(*b*), we loop over all mapping tables of span highSpan ($2^{25}$) associated with PMO highPMO (PMO 864). For mapping table 874, we find that page table 878 already exists. For mapping table 884, step 1130 creates page table 888 but does not fill it in. This concludes the discussion of downward recursion in phase one.

FIG. 15 shows the results after upward recursion (FIG. 10) and downward recursion (FIG. 11) from MOR 863 after the mapping tables have been filled in during the second phase of omnibus wiring. Upward recursion proceeds as described above in connection with FIG. 13. Now step 1015 determines that we are in phase 2 and step 1016 determines that PMO 862 is not already omnibus wired, so steps 1018 increments the numOmnibusWired field in PMO 860 from zero to one. Also, step 1024 marks both PMO 860 and PMO 862 as omnibus wired. Also step 1046 sets mapping table entry 881 to point to mapping table 884.

Downward recursion proceeds as described above in connection with FIG. 14. Step 1126 sets mapping table entry 885 to point to page table 888. Step 1126 also sets mapping table entry 889 to refer to the physical page frame and to indicate that the page is read-only for process B's memory space.

ii) A second example

Figure 16:
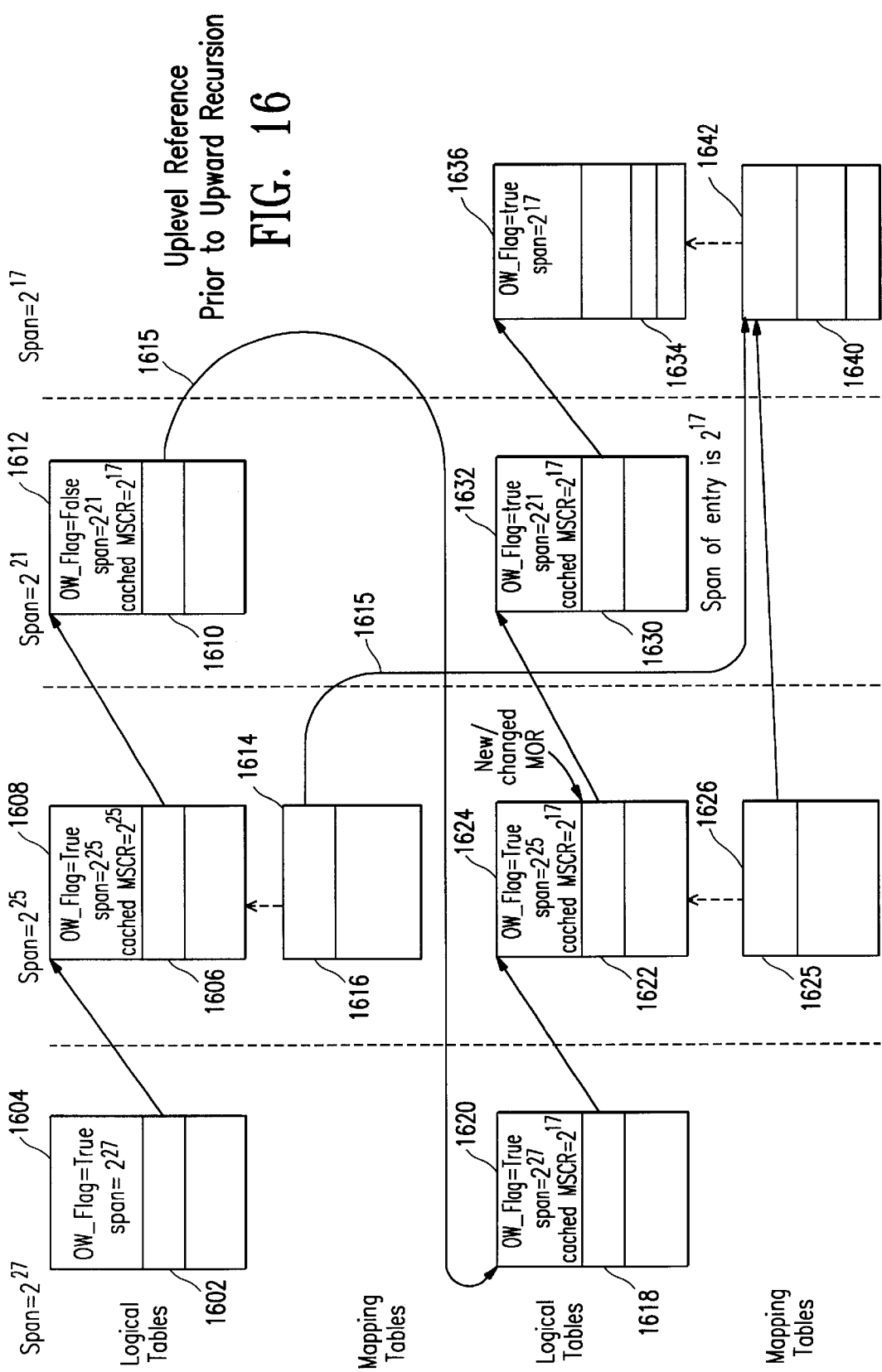
FIG. 16 is a diagram showing an example of use of the MSCR field in a preferred embodiment of the present invention.
Figure 17:
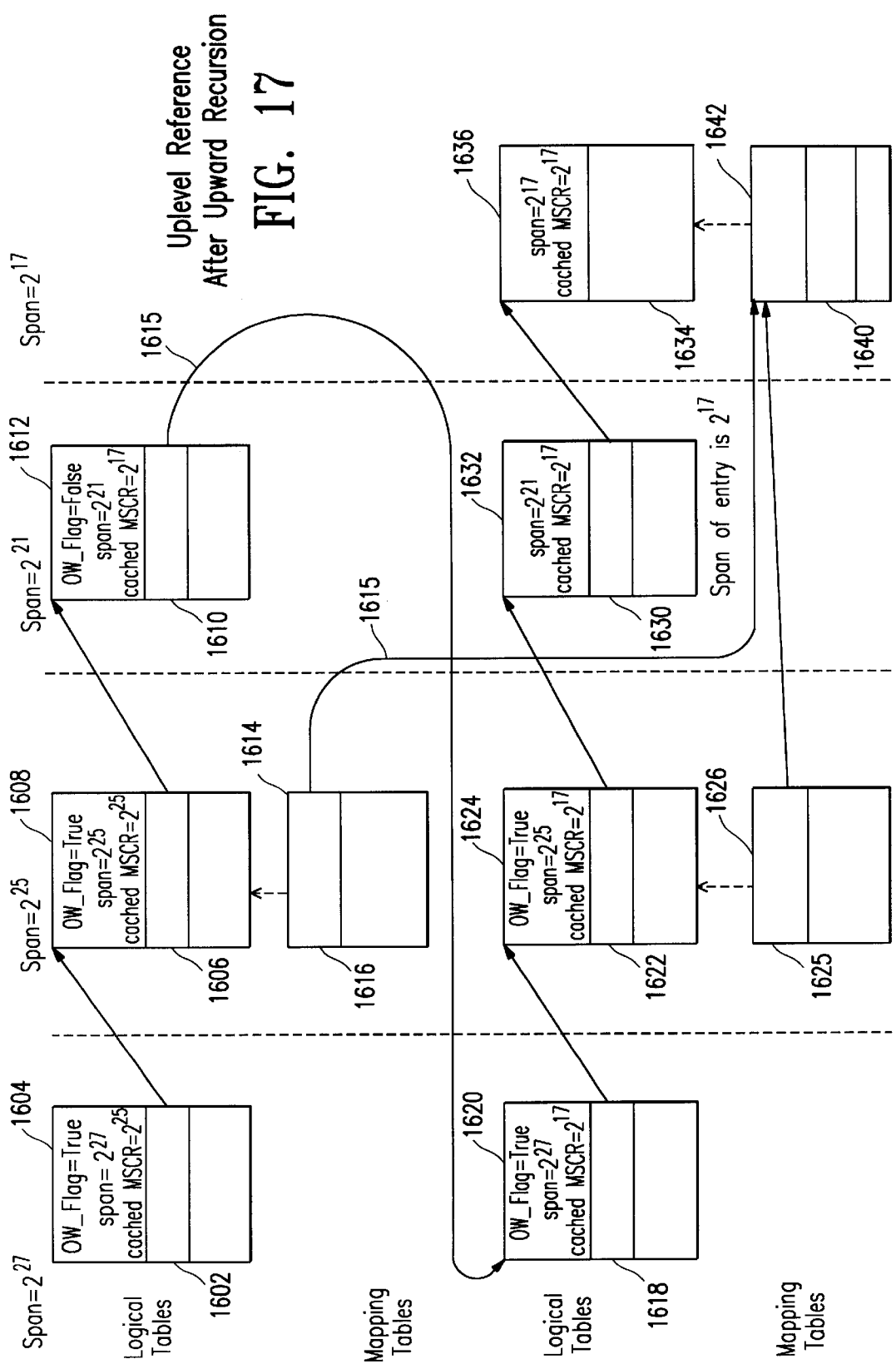
FIG. 17 is a diagram showing the result of use of the MSCR field in a preferred embodiment of the present invention.

The circumstance requiring the cached MSCR field 406 is shown in a second example of FIGS. 16 and 17. In those Figures, an uplevel reference 1615 exists from PMO 1612 to PMO 1620. Thus, there are two address paths to the omnibus wired PMO 1636, and one of them involves uplevel reference 1615. In the example, MOR 1622 is being altered and, therefore, must also be omnibus wired. Normally, it would seem a safe assumption that omnibus wiring could stop recursing when it encounters an upward memory object that is already omnibus wired. FIGS. 16 and 17 show why this assumption is not always true. In the example of FIG. 16, PMO 1620 has its omnibus wired flag 402 set to True. As shown in FIG. 16, however, the upward recursion cannot stop at PMO 1620, or PMO 1612 will not get marked as omnibus wired. PMO 1612 needs to be marked as omnibus wired because it is part of an address path referencing omnibus wired PMO 1636.

The method begun in FIG. 9(*b*) and continued in FIG. 10(*b*) carries out omnibus wiring with respect to a MOR in a PMO. In the example of FIGS. 16 and 17, MOR 1622 of PMO 1624 is to be examined. Step 955 of FIG. 9(*b*) calls the recursive procedure OmnibusWireMOR, where MOR m is MOR 1622. This recursive procedure is shown in FIG. 10(*b*). SpanUpdated is a value larger than any valid mapping table span. In step 1036, PMO P is PMO 1624, which contains MOR m 1622. The variable PMTSpan is set to the span of the smallest mapping table that could be associated with PMO P 1624, i.e., to $2^{25}$, which is the span of mapping table 1625. The variable mIndex is set to the product of 1) the index of MOR 1622 in PMO 1624 and 2) the span of MOR 1622 ($2^{21}$). NewSpanUpdated value is $2^{25}$ and is determined as shown in FIG. 10(*c*). The true MSCR of PMO 1624 is determined as shown in FIG. 10(*d*). In step 1038, the true MSCR value of PMO 1624 is less than newSpanUpdated, and control passes recursively to the steps of FIG. 10(*a*). Here, the true MSCR value of PMO 1624 is $2^{17}$ and newSpanUpdated is larger, so the test of step 1038 is true and control passes to the procedure OmnibusWire-MemoryObject of FIG. 10(*a*) to omnibus wire PMO 1624. As shown in FIG. 10(*a*), steps 1008 through 1020 loop for each MOR that references PMO 1624 (for example, MOR 1618 ).

In the example of FIG. 16, the PMOs have the following cached MSCR field values:

| PMO | cached MSCR |
|---|---|
| PMO 1632 | $2^{17}$ |
| PMO 1624 | $2^{17}$ |
| PMO 1620 | $2^{17}$ |
| PMO 1612 | $2^{17}$ |
| PMO 1608 | $2^{25}$ |

In the example, the true MSCR values are all cached in the tables (they could have been recursively determined previously).

Note that PMO 1608 has a cached MSCR value of $2^{25}$. If we follow the tree of memory objects upstream from PMO 1608, we will never find associated mapping tables with entries of span smaller than the true MSCR of PMO 1608 (i.e., smaller than $2^{25}$). PMOs 1612, 1620, 1624, and 1632 each has a cached MSCR field value of $2^{17}$. PMO 1608 (which points either directly or indirectly to each of these PMOs) can (and does) have an associated mapping table 1616 of span $2^{25}$, containing entries of span $2^{17}$.

Step 1038 of FIG. 10(*b*) determines whether to go back farther when omnibus wiring a MOR. If step 1038 determines whether the true MSCR field of the current PMO is greater than or equal to newSpanUpdated, control passes to step 1046 and no further upward recursion occurs. Thus, for example, because the true MSCR of the PMO 1624 containing the MOR 1622 is $2^{17}$, upward recursion will not stop at PMO 1624 (because $2^{17} < 2^{25}$). Instead, control falls through step 1308 to step 1040 and upward recursion continues with a call to OmnibusWireMemoryObject for PMO 1624. In contrast, upward recursion will stop at MOR 1606, since the true MSCR of PMO 1608 is $2^{25}$ and newSpanUpdated at that point is also $2^{25}$. Thus, the test of step 1308 will fail when PMO 1308 is being examined.

Thus, when OmnibusWireMemoryObject is called for PMO 1620, it causes OmnibusWireMOR to be called in step 1014 for all MORs that refer directly to PMO 1620. When OmnibusWireMOR is called for MOR 1610 (which refers directly to PMO 1620), it causes OmnibusWireMemoryObject to be called in step 1040 for PMO 1612 (which contains MOR 1610). When OmnibusWireMemoryObject is called for PMO 1612, it causes OmnibusWireMOR to be called in step 1014 for all MORs that refer directly to PMO 1612. When OmnibusWireMOR is called for MOR 1606 (which refers directly to PMO 1612), R causes OmnibusWireMemoryObject to be called for PMO 1608 (which contains MOR 1606). As discussed above, at this point, PMTSpan and newSpanUpdated are both $2^{25}$, the true MSCR of PMO 1608 is equal to newSpanUpdated (see step 1038) and the omnibus wiring process does not need to go upward any further.

Thus, as shown in FIG. 17, the omnibus wiring flag 402 is set to True in step 1024 for all PMOs in the path of the uplevel reference. FIG. 17 shows that PMO 1612 in this path has its $OW_{13}$Flag changed from False to True (step 1024 ).

In addition, a number of omnibus wired (#OW) field (not shown) in PMO 1608 is incremented in step 1018 for MOR 1606 to reflect the fact that the MOR 1606 refers to PMO 1612 that is now omnibus wired. Similarly, the mapping tables for all PMOs in the path of the uplevel reference are set up in step 1046 of FIG. 10(*b*).

b. De-Omnibus Wiring

To de-omnibus wire a page, it is necessary to recurse upwards through all PMOs that reference the page, decrementing the #OW field in each PMO encountered. If the #OW field of a PMO becomes "0", the omnibus wired flag 402 of the PMO is set to False and the recursion continues. The described embodiment does not delete read-only page tables when a page stops being read-only, but this also could be done without departing from the spirit or scope of the present invention. Objects are also de-omnibus wired when a process stops sharing memory space that is omnibus wired.

c. Degenerate Mapping Table

Figure 18:
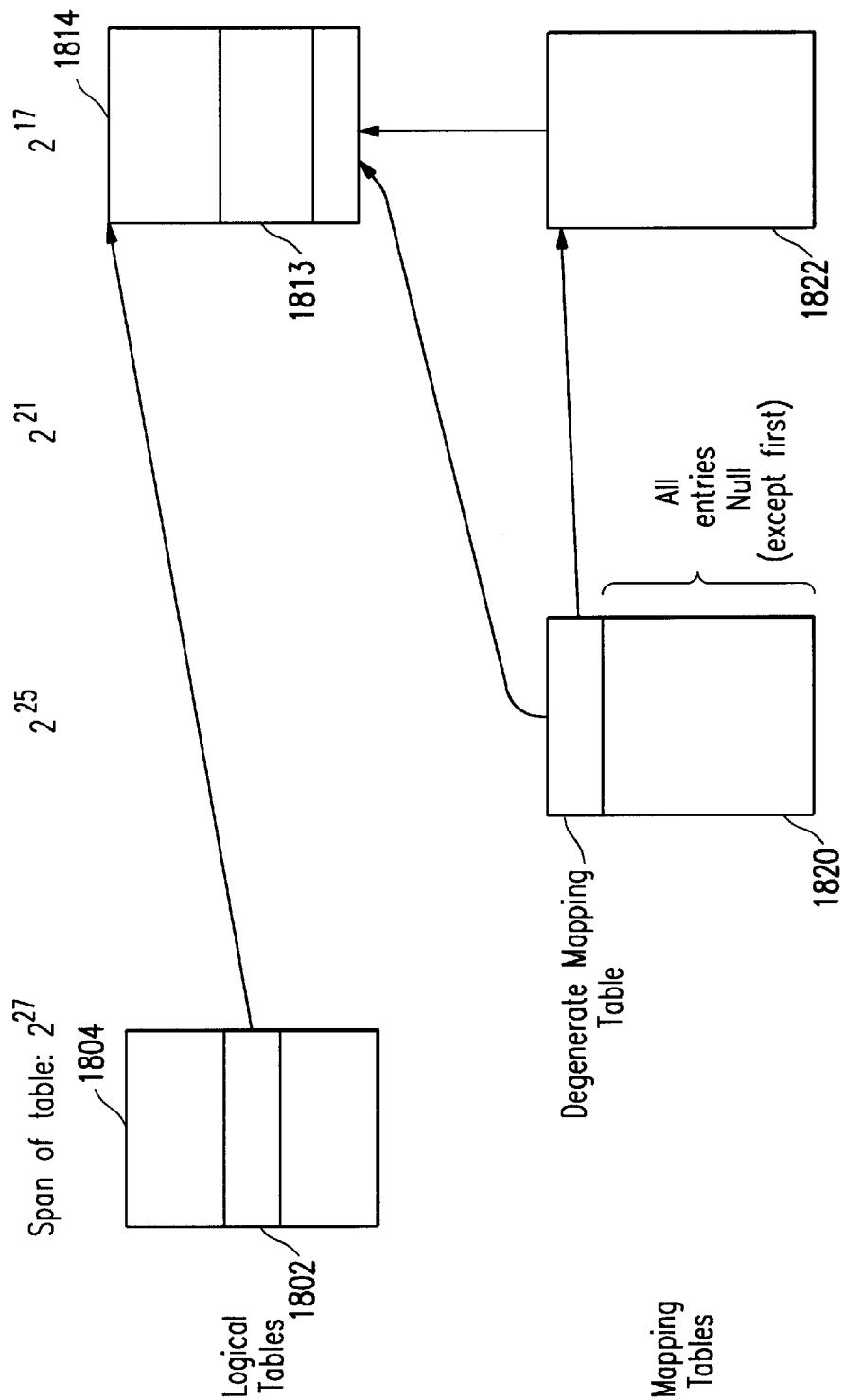
FIG. 18 shows an example of a "degenerate mapping table."

An example of a degenerate mapping table is shown in FIG. 18. A degenerate mapping table is a mapping table M of span R associated with a PMO P whose span S is small enough to also produce the next smaller mapping table. Only the first entry in M can be non-null, and if non-null, the first entry must refer to a table that is also associated with P.

d. Summary

In summary, the present invention provides an "omnibus wired" status for elements in a virtual memory system. If a page has its omnibus wired flag set to True, all mapping tables for all references to the page are present and filled in. If a memory object has an "omnibus wired" flag set to True, it implies that at least one page referenced by that memory object is present in memory and that the mapping tables required to access that page are also present in memory and filled in so that the page can be reached via the mapping tables. In the described embodiment, omnibus wired pages (and their associated page tables) cannot be swapped out. Therefore, pages that the system designates as "locked" should also be omnibus wired. Omnibus wiring also occurs when a process begins to share a memory object of another process, where at least part of the shared memory is already omnibus wired.

While the invention has been described in conjunction with a specific embodiment, it is evident that many alternatives, modifications and variations will be apparent to those skilled in the art in light of the foregoing description.

Accordingly, it is intended to embrace all such alternatives, modifications and variations as fall within the spirit and scope of the appended claims and equivalents.

What is claimed is:

1. A method, performed by a data processing system having a virtual memory system, to omnibus wire a page in a memory of the data processing system, comprising:

following a first group of pointers that refer to the omnibus wired page upwards in the virtual memory system to ensure that all elements referenced by the first group of pointers are also omnibus wired, where omnibus wiring the page guarantees that the page is present in memory, that all mapping tables referencing the omnibus wired page are also present in memory, and that the omnibus wired page can be referenced via the mapping tables; and following a second group of pointers that also refer to the omnibus wired page, where the second group of pointers are part of an uplevel reference, upwards in the virtual memory system to ensure that all memory elements referenced by the second group of pointers are also omnibus wired.

2. The method of claim 1, wherein the act of following the first group of pointers includes creating a mapping table, if the mapping table is not present in the memory.

3. The method of claim 2, further including the act of filling in the created mapping table so that the omnibus wired page can be reached via the mapping table.

4. The method of claim 1, further including the act of filling in an existing mapping table so that the omnibus wired page can be reached via the mapping table.

5. The method of claim 1, wherein the act of following the second group of pointers includes checking a cached MSCR field in a first memory element in the second group and, if the cached MSCR field is greater than or equal to a span of a memory element in the second group, stopping the upwards recursion.

6. The method of claim 1, further including the act of setting a cached MSCR value in at least one Partitioned Memory Object (PMO) in the virtual memory system, where the cached MSCR value indicates, for all Memory Object references (MORs) referring to the PMO directly or indirectly, the smallest mapping table reference span that could be associated with any the referring MORs.

7. A method, performed by a data processing system having a virtual memory system, to omnibus wire a page in a memory of the data processing system, comprising:
setting, when the omnibus wired page and all mapping tables pointing to the omnibus wired page are present in the memory, an omnibus wiring flag in a data structure associated with each of the mapping tables, where the omnibus wired page is shared by more than one process and the page's omnibus wiring flag indicates that the page is present in memory and the mapping tables pointing to the page's location are present and filled in for all possible address references to the page; and
when determining which page to swap out of memory, declining to swap out the omnibus wired page.

8. An apparatus having a virtual memory system, that omnibus wires a page in its memory, comprising:
software circuitry configured to follow a first group of pointers that refer to the omnibus wired page upwards in the virtual memory system to ensure that all elements referenced by the first group of pointers are also omnibus wired, where omnibus wiring the page guarantees that the page is present in memory, that all mapping tables referencing the omnibus wired page are also present in memory, and that the omnibus wired page can be referenced via the mapping tables; and
software circuitry configured to follow a second group of pointers that also refer to the omnibus wired page, where the second group of pointers are part of an uplevel reference, upwards in the virtual memory system to ensure that all memory elements referenced by the second group of pointers are also omnibus wired.

9. The apparatus of claim 8, wherein the software circuitry configured to follow the first group of pointers includes software circuitry configured to create a mapping table, if the mapping table is not present in the memory.

10. The apparatus of claim 9, further including software circuitry configured to fill in the created mapping table so that the omnibus wired page can be reached via the mapping table.

11. The apparatus of claim 8, further including software circuitry configured to fill in an existing mapping table so that the omnibus wired page can be reached via the mapping table.

12. The apparatus of claim 8, wherein the software circuitry configured to follow the second group of pointers includes software circuitry configured to check a cached MSCR field in a first memory element in the second group and, software circuitry configured to stop the upwards recursion, if the cached MSCR field is greater than or equal to a span of a memory element in the second group.

13. The apparatus of claim 8, further including software circuitry configured to set a cached MSCR value in at least one Partitioned Memory Object (PMO) in the virtual memory system, where the cached MSCR value indicates, for all Memory Object references (MORs) referring to the PMO directly or indirectly, the smallest mapping table reference span that could be associated with any the referring MORs.

14. An apparatus, having a virtual memory system, that omnibus wires a page in its memory, comprising:
software circuitry configured to set, when the omnibus wired page and all mapping tables pointing to the omnibus wired page are present in the memory, an omnibus wiring flag in a data structure associated with each of the mapping tables, where the omnibus wired page is shared by more than one process and the page's omnibus wiring flag indicates that the page is present in memory and the mapping tables pointing to the page's location are present and filled in for all possible address references to the page; and
software circuitry configured to decline to swap out the omnibus wired page, when determining which page to swap out of memory.

15. An apparatus, having a virtual memory system, that omnibus wires a page in its memory, comprising:
means for following a first group of pointers that refer to the omnibus wired page upwards in the virtual memory system to ensure that all elements referenced by the first group of pointers are also omnibus wired, where omnibus wiring the page guarantees that the page is present in memory, that all mapping tables referencing the omnibus wired page are also present in memory, and that the omnibus wired page can be referenced via the mapping tables; and
means for following a second group of pointers that also refer to the omnibus wired page, where the second group of pointers are part of an uplevel reference, upwards in the virtual memory system to ensure that all memory elements referenced by the second group of pointers are also omnibus wired.

16. The apparatus of claim 15, wherein the means for following the first group of pointers includes means for creating a mapping table, if the mapping table is not present in the memory.

17. The apparatus of claim 16, further including means for filling in the created mapping table so that the omnibus wired page can be reached via the mapping table.

18. The apparatus of claim 15, further including means for filling in an existing mapping table so that the omnibus wired page can be reached via the mapping table.

19. The apparatus of claim 15, wherein the means for following the second group of pointers includes means for checking a cached MSCR field in a first memory element in the second group and, means for stopping the upwards recursion, if the cached MSCR field is greater than or equal to a span of a memory element in the second group.

20. The apparatus of claim 15, further including means for setting a cached MSCR value in at least one Partitioned Memory Object (PMO) in the virtual memory system, where the cached MSCR value indicates, for all Memory Object references (MORs) referring to the PMO directly or indirectly, the smallest mapping table reference span that could be associated with any the referring MORs.

21. An apparatus, having a virtual memory system, that omnibus wires a page in its memory, comprising:
  means for setting an omnibus wiring flag in a data structure associated with each of the mapping tables, when the omnibus wired page and all mapping tables pointing to the omnibus wired page are present in the memory, where the omnibus wired page is shared by more than one process and the page's omnibus wiring flag indicates that the page is present in memory and the mapping tables pointing to the page's location are present and filled in for all possible address references to the page; and
  means for declining to swap out the omnibus wired page, when determining which page to swap out of memory.

22. A computer program product comprising:
  a computer usable medium having computer readable code embodied therein for omnibus wiring a page in a memory of a system having a virtual memory, including:
    computer readable program code devices configured to follow a first group of pointers that refer to the omnibus wired page upwards in the virtual memory system to ensure that all elements referenced by the first group of pointers are also omnibus wired, where omnibus wiring the page guarantees that the page is present in memory, that all mapping tables referencing the omnibus wired page are also present in memory, and that the omnibus wired page can be referenced via the mapping tables; and
    computer readable program code devices configured to follow a second group of pointers that also refer to the omnibus wired page, where the second group of pointers are part of an uplevel reference, upwards in the virtual memory system to ensure that all memory elements referenced by the second group of pointers are also omnibus wired.

23. The computer program product of claim 22, wherein the computer readable program code devices configured to follow the first group of pointers include computer readable program code devices configured to create a mapping table, if the mapping table is not present in the memory.

24. The computer program product of claim 23, further including computer readable program code devices configured to fill in the created mapping table so that the omnibus wired page can be reached via the mapping table.

25. The computer program product of claim 22, further including computer readable program code devices configured to fill in an existing mapping table so that the omnibus wired page can be reached via the mapping table.

26. The computer program product of claim 22, wherein the computer readable program code devices configured to follow the second group of pointers includes computer readable program code devices configured to check a cached MSCR field in a first memory element in the second group and computer readable program code devices configured to stop the upwards recursion, if the cached MSCR field is greater than or equal to a span of a memory element in the second group.

27. The computer program product of claim 22, further including computer readable program code devices configured to set a cached MSCR value in at least one Partitioned Memory Object (PMO) in the virtual memory system, where the cached MSCR value indicates, for all Memory Object references (MORs) referring to the PMO directly or indirectly, the smallest mapping table reference span that could be associated with any the referring MORs.

28. A computer program product, comprising:
  a computer usable medium having computer readable code embodied therein for omnibus wiring a page in a memory of a system having a virtual memory, including:
    computer readable program code devices configured to set an omnibus wiring flag in a data structure associated with each of the mapping tables, when the omnibus wired page and all mapping tables pointing to the omnibus wired page are present in the memory, where the omnibus wired page is shared by more than one process and the page's omnibus wiring flag indicates that the page is present in memory and the mapping tables pointing to the page's location are present and filled in for all possible address references to the page; and
    computer readable program code devices configured to decline to swap out the omnibus wired page, when determining which page to swap out of memory.

* * * * *